United States Patent [19]
Mohan et al.

[11] Patent Number: 5,343,079
[45] Date of Patent: Aug. 30, 1994

[54] STANDBY POWER SUPPLY WITH LOAD-CURRENT HARMONICS NEUTRALIZER

[75] Inventors: Ned Mohan, St. Paul; Maximilian R. Peterson, Rochester; Conor A. Quinn, St. Paul, all of Minn.

[73] Assignee: Regents of the University of Minnesota, Minneapolis, Minn.

[21] Appl. No.: 991,091

[22] Filed: Dec. 15, 1992

Related U.S. Application Data

[63] Continuation-in-part of Ser. No. 661,341, Feb. 25, 1991, Pat. No. 5,172,009.

[51] Int. Cl.$^5$ ............................................. H02J 3/01
[52] U.S. Cl. ................................. 307/105; 307/46; 363/40; 363/44
[58] Field of Search .................. 307/46, 64, 66, 105; 363/40, 44

[56] References Cited

U.S. PATENT DOCUMENTS

| | | | |
|---|---|---|---|
| 4,053,820 | 10/1977 | Peterson et al. | 363/44 |
| 4,224,660 | 9/1980 | Mohan | 363/48 |
| 4,706,860 | 3/1990 | Asaeda | 307/105 |
| 4,812,669 | 3/1989 | Takeda et al. | 307/105 |
| 4,967,334 | 10/1990 | Cook et al. | 363/34 |
| 5,047,909 | 9/1991 | Hosada | 363/40 |
| 5,172,009 | 12/1992 | Mohan et al. | 307/46 |
| 5,221,862 | 6/1993 | Fiorina et al. | 307/66 |

FOREIGN PATENT DOCUMENTS 330755 9/1989 European Pat. Off. ............. 307/105

OTHER PUBLICATIONS

Mohammad-Reza Ghotbi, "Line-Current Harmonics-Neutralized Uninterruptible Power Supplies," a Thesis Submitted to the University of Minnesota (Jul. 1990).
T. Kawabata, et al., "Chargerless UPS Using Multi--Functional BIMOS Inverter . . . ", *Conference Record of the 1986 IEEE Industry Applications Society Annual Meeting*, vol. 1, pp. 513–520 (Sep. 28, 1986).
T. Kawabata, et al., "UPS Systems Using Multi-Functional Inverters", *INTELEC '87: Ninth International Telecommunications Energy Conference . . . Proceedings*, pp. 525–530 (Jun. 14, 1987).
T. Kawabata, et al., "Three Phase Parallel Processing UPS Using Multi–Functional Inverter," 1989 *IEEE IAS Annual Meeting*, pp. 982–987.
H. Yonemori, et al., "A Novel Type of High-Quality UPS System . . . ", *Official Proceedings of the First International PCIM '88 (Power Conversion) Conference*, pp. 324–332 (Dec. 8, 1988).
S. Manias, et al., "Bilateral DC to AC Converter Employing a High Frequency Link," 1985 *IEEE/IAS Annual Meeting Record*, pp. 1156–1162.

(List continued on next page.)

*Primary Examiner*—Jeffrey L. Sterrett
*Attorney, Agent, or Firm*—Flehr, Hohbach, Test, Albritton & Herbert

[57] ABSTRACT

A standby power supply system is provided for supplying normal AC power to a critical load from an AC power source during normal operating conditions, and for supplying emergency AC power to the load during failure of the AC power source. During normal operation, the standby power supply system actively neutralizes undesirable harmonic components in the input current drawn by the load. The standby power supply system includes a power conversion device having a DC side coupled to a back-up power source and an AC side in parallel with the load and the AC source. A harmonic distortion sensor senses a harmonic distortion current component of a load current drawn by the load during normal operating conditions. A controller is responsive to the harmonic distortion sensor for causing the power conversion device to produce a harmonics neutralizing current to substantially neutralize the harmonic distortion current component produced by the load. A method is also provided for supplying AC power to a load during normal and emergency operating conditions.

22 Claims, 8 Drawing Sheets

OTHER PUBLICATIONS

P. K. Sood, et al., "A Versatile Power Converter for High Frequency Link Systems," *APEC/IEEE* (1987) pp. 249–256.

T. Shirae, et al., "Development of Five Novel 10 KaVA UPS's for Office Use," 1990 *IPEC Conference* (Tokyo, Japan), pp. 91–98.

M. Koyama, et al., "High Frequency Link DC/AC Converter with PWM Cycloconverter for UPS," 1990 *IPEC Conference* (Tokyo, Japan), pp. 748–754.

T. A. Lipo and P. K. Sood, "Study of Generator/Motor Operation of Induction Machines in a High Frequency Link Space Power System," *NASA Contractor Report No. 179600, Prepared for the Lewis Research Center Under Grant No. NAG3*–631 (Mar. 1987), Abstract.

Grady et al., "Improving Power Quality with Active Power Line Conditioners," *Mitigation Techniques II,* 1991.

Grady, "Recommended Practices in Power Quality: IEEE 519 and IEC 555 Guidelines," Leveraging Technology to Enhance Customers' Power Quality Workshop, (Teaneck, New Jersey), Jul. 29, 1992.

IEEE Recommended Practices and Requirements for Harmonic Control in Electric Power Systems, Project IEEE–519, Oct. 1991.

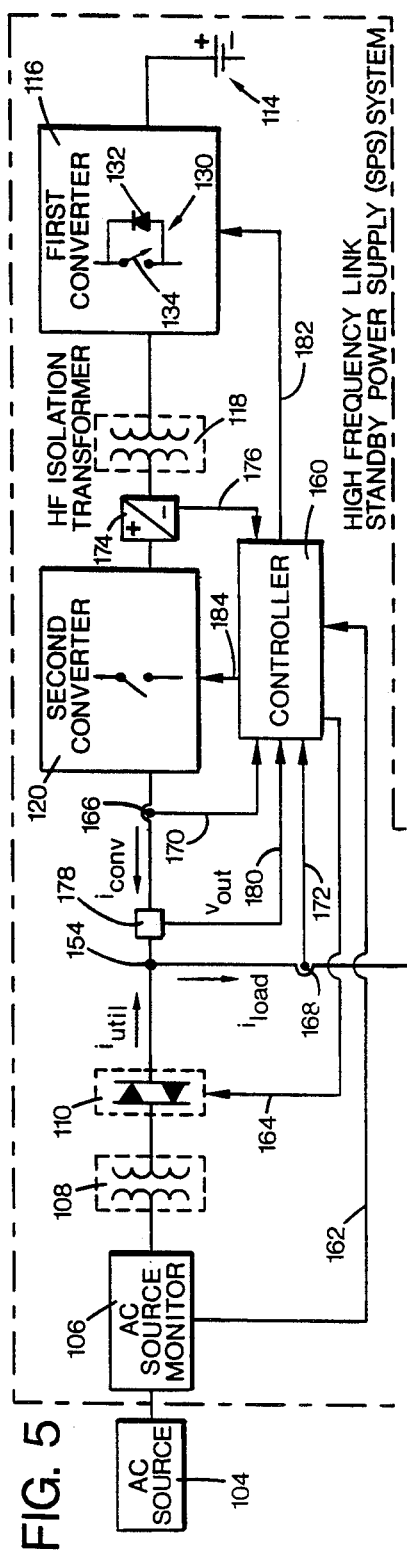
FIG. 5
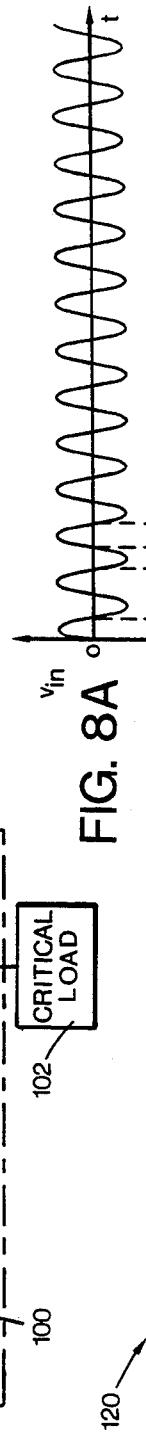
FIG. 8A
FIG. 8B
FIG. 8C
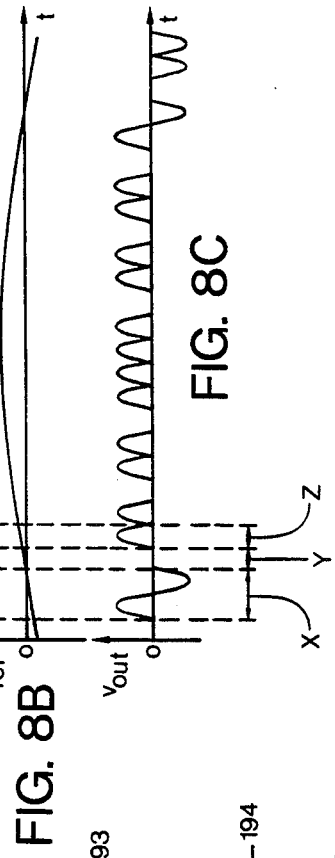
FIG. 7B
FIG. 7A

STANDBY POWER SUPPLY WITH LOAD-CURRENT HARMONICS NEUTRALIZER

This is a continuation-in-part application of co-pending U.S. patent application Ser. No. 07/661,341, filed Feb. 25, 1991, now U.S. Pat. No. 5,172,009, which has at least one coinventor in common therewith.

BACKGROUND OF THE INVENTION

The present invention relates generally to a load current harmonics neutralizing apparatus for interfacing a critical load with an AC power source, and more particularly to an active harmonic filtering system and a standby power supply (SPS) system for powering computer, communication, medical and other equipment, during both normal and emergency conditions, such as utility power line outages.

A revolution in the fields of microelectronics technology and the information sciences has led to the widespread use of critical electrical loads, such as in the communication and medical fields. Another recent revolution in power electronic technologies has resulted in the widespread use of nonlinear loads, including personal computers, adjustable speed drives for air conditioners and heat pumps, uninterruptible power supplies, high frequency fluorescent lights, microwave ovens and various other office and consumer electronics equipment. This trend is expected to continue in the future.

The problem of static power converters creating harmonic currents on power systems was first addressed by the IEEE in 1981 with the introduction of the Standard IEEE No. 519-1981, entitled "IEEE Guide for Harmonic Control and Reactive Compensation of Static Power Converters." Many of the users of the new non-linear electric loads did not have electrical engineers on staff to even recognize the harmonics problems, so the IEEE standard established a performance baseline.

In an article by C. K. Duffey and R. P. Stratford entitled, "Update of Harmonic Standard IEEE-519, IEEE Recommended Practices and Requirements for Harmonic Control in Electric Power Systems," IEEE Paper No. PCIC-88-7 (IEEE, 1988), a large industrial plant was studied, and the guidelines from Standard IEEE-519 were applied. Half of the plant's load was attributed to a twelve-pulse static power converter. The equivalent harmonic current distortion of the odd harmonics above the seventh (11, 13, 23, 25, 35, etc.) were higher than the baseline of IEEE-519. If there are other users on the line, the article noted that the utility system may be distorted beyond that allowed by the standard.

While harmonic filters could be placed on the line to reduce the current and voltage distortion to within acceptable limits, such harmonic filters are costly, both in terms of initial cost and operating cost. The Duffey/Stratford article concluded that the most effective way to correct harmonic distortion is where the customer couples with the electric utility. Without harmonic correction, the increased use of non-linear electric loads threatens to deteriorate the high quality power for which North America is well known.

Many nonlinear loads operate on single-phase alternating current (AC) power received from an electric utility. During a utility power outage, a battery backup is often required to avoid the loss of critical information, functions or services. A variety of UPS systems have been designed to meet these emergency power needs.

Conventional UPS systems provide an interface between the utility power system input and a critical load (personal computers, communication and medical equipment, and other loads normally receiving AC power and requiring battery backup power will herein be referred to as "critical loads"). Basically, the AC power from the utility is first rectified, and a small portion of the rectified power is used to charge the backup battery. The remaining portion of the rectified power is supplied to the critical load through an inverter, which converts the DC voltage to nearly sinusoidal line or fundamental frequency (e.g., 50 Hz in Europe or 60 Hz in the United States) voltage, to the critical load. During a utility power outage emergency condition, power is supplied by the battery through the inverter to the load.

Conventional UPS systems typically have a rectifier/charger which receives AC power from an AC power utility through a static interrupter and rectifies it into DC power. A portion of the rectified DC power charges a battery bank during normal operating conditions. A line-frequency isolation transformer is often included between the interrupter and the critical load. During normal operating conditions, the interrupter is closed to allow the AC power to flow therethrough to a critical load.

During a utility power outage, the static interrupter opens to isolate the load from the utility. The battery bank powers the load through a pulse width modulated (PWM) DC-to-AC inverter. Line-frequency isolation transformers may be placed between the inverter and the load. Thus, power is maintained to the load during both normal and emergency operating conditions. Alternatively, during normal operation, power is supplied to the load through the rectifier/charger, the inverter and an isolation transformer. In this alternate embodiment, the AC power supplied through the interrupter and isolation transformer (if used) is merely an additional backup feature to further enhance the reliability of the UPS system.

The known conventional UPS systems suffer several significant drawbacks. For example, the line-frequency isolation transformers are bulky, expensive and introduce substantial power losses into the UPS system.

The conventional UPS systems disadvantageously inject undesirable current harmonics into the utility system. These injected current harmonics produce line voltage distortion which interferes with other loads connected to the same line voltage supply. The rectifier/charger and the inverter are each sources of these undesirable current harmonics. However, the inverter harmonic currents are decoupled from the utility by the rectifier/charger and by using an isolation transformer. An active filtering system to actively neutralize harmonic currents injected by an AC-to-DC converter into an AC power transmission system is disclosed in U.S. Pat. Nos. 4,053,820 and 4,224,660 (one inventor of the present invention being a co-inventor and the sole inventor, respectively, of these patents).

Another significant source of undesirable current harmonics is the critical load itself, which is often some form of a DC power supply. Conventionally, the input section of a rectifier/charger is a diode-bridge rectifier. The electrical characteristics at the input of this diode-bridge rectifier are identical to the input characteristics of the critical load. Therefore, the current drawn from the utility by a conventional UPS system comprises large amplitudes of harmonic currents. These harmonic currents can significantly interfere with other loads on the electric power line and with nearby telephone equipment. Additionally, these harmonics cause unnecessary heating of these other loads, and often contribute to a malfunction of ripple control systems within these other loads.

A variation of the above UPS system arrangement is known as a standby power supply (SPS) system. Under normal conditions, the SPS system delivers AC power directly from the utility to the critical load. During an emergency power outage, the SPS system supplies battery power through an inverter to the critical load. As mentioned above, the highly nonlinear input characteristic of the critical load draws a load current that is rich in harmonics of the fundamental line frequency. Since the critical load is supplied directly from the utility via the SPS system under normal conditions, the current drawn from the utility by the SPS system has large amounts of harmonic components.

For example, one SPS system proposed by Kawabata is coupled in parallel with the electric utility and the non-linear load. Kawabata requires that a very large inductive reactance be coupled in series between the utility and Kawabata's SPS system. With Kawabata, if the utility line voltage is distorted, a distorted current is drawn from the utility to power the load during normal operating conditions. Kawabata's system experiences this difficulty in both single phase and three phase embodiments.

Thus, both the conventional UPS and SPS systems disadvantageously draw undesirable harmonic current components from the utility system.

High technology electrical loads typically have a highly nonlinear input characteristic, that is, the input current drawn by these loads is rich in harmonics of the fundamental line frequency. For example, the lower-order harmonics, such as the third and fifth harmonic current components, can have very large magnitudes. With single phase nonlinear loads, the amplitude of the third harmonic component may come close to the amplitude of the fundamental frequency current component.

In a three phase, four wire power supply system, such as the service used to supply large residential, commercial and office buildings, the phase to neutral voltages are distributed to the various building floors in an attempt to balance the load on each of the phases. The third harmonic current components from each phase are combined and carried on the fourth neutral wire. These large harmonic currents on the neutral conductor result because the zero-sequence harmonic currents on the phase conductors add up on the neutral wire, rather than cancelling each other out. In several cases, the neutral wire itself has heated to the extent of becoming a fire hazard.

One possible expensive solution to neutral overheating is to replace the neutral wire with a larger conductor, but far more damaging is the effect of the neutral wire harmonic currents on the customer's distribution transformer and the utility's substation power transformer. The compounding of the neutral conductor harmonics currents from the various utility customers can cause the substation transformer to become overloaded and overheated, which may ultimately lead to transformer failure and a power outage for the customers.

To avoid a transformer burnout, the substation transformer may be replaced by a transformer having a higher current rating, but this is a very expensive solution. Another approach proposed in the past uses three single phase active filters at the four wire service entrance to each building. Each active filter is connected between a phase line and the neutral line to supply the harmonic currents drawn by the load so the harmonics are not drawn from the utility source through the substation transformer. Such single phase active filters are costly, both in terms of their initial installation, and their electrical losses during operation.

For the three phase four wire systems, in the past, the harmonics have been filtered using single phase passive filters, active filters and hybrid approaches. The passive approaches are simple, but often bulky and expensive. Moreover, the passive filters have components sensitive to temperature and aging which lead to ineffective filtering as the critical frequencies and Q-values drift. Using passive approaches, the danger exists of exciting a resonance condition with the AC system impedance, which can worsen, rather than alleviate the harmonic problem.

The active filter approaches proposed in the past have used three single phase active filters, which has proved very effective. However, these earlier systems are costly, requiring twelve controlled switches to operate. Moreover, these earlier three phase three wire active filter arrangements cannot be used in a three phase four wire system to eliminate harmonics on the neutral wire.

Thus a need exists for an improved load current harmonics neutralizing apparatus for interfacing a critical load with an AC power source, and more particularly to an active harmonic filtering system and a standby power supply (SPS) system, which are directed toward overcoming, and which are not susceptible to, the above limitations and disadvantages.

SUMMARY OF THE INVENTION

According to one aspect of the present invention, a load current harmonics neutralizing apparatus is provided for coupling an electrical load with an AC source. The apparatus has a power converter responsive to a control signal. The converter has an AC side and a DC side, with the AC side for coupling in parallel with the AC power source and the load. A DC voltage device is coupled to the DC side of the power converter. The apparatus has a harmonic current sensing device for sensing a harmonic current drawn by the load. A controller is responsive to the harmonic current sensing device for generating the control signal to operate the converter to generate a harmonic neutralizing current on an instantaneous basis having an amplitude substantially equal to the distorted harmonic current drawn by the load.

In one illustrated embodiment, the load current harmonics neutralizing apparatus takes the form of an active filtering system, and in another embodiment, it takes the form of a standby power supply system.

It is an overall object of the present invention to provide a standby power supply system and a method for providing power to a critical load during both normal and emergency conditions.

A further object of the present invention is to provide a SPS system and method of actively filtering undesirable current harmonics, such as the load-current harmonics produced by a nonlinear critical load, to substantially prevent these harmonics from adversely effecting the AC power source, such as a utility system, during normal operation.

Still a further object of the present invention is to provide an improved SPS system and method for use with a non-linear critical load so the load appears to an AC power source to be a substantially linear load during normal operation.

Another object of the present invention is to provide an active harmonic filtering system for use with a three phase four wire utility service, to neutralize load current harmonics and prevent damage to distribution and substation transformers.

Still a further object of the present invention is to provide an SPS system and an active harmonic filtering system which are each highly reliable, more economical, and physically smaller than other known SPS, UPS or filtering systems.

The present invention relates to the above features and objects individually as well as collectively. These and other objects, features and advantages of the present invention will become apparent to those skilled in the art from the following description and drawings.

BRIEF DESCRIPTION OF THE DRAWINGS

FIG. 5 is a single line, schematic block diagram of an alternate form of a standby power supply system of the present invention comprising a high frequency link standby power supply system;

FIG. 7a is a schematic diagram of one form of a second converter which may be used in the high frequency link standby power supply system of FIG. 5, and FIG. 7b is a schematic diagram of one form of a switch assembly which may be used in the second converter of FIG. 7a;

FIGS. 8a, 8b and 8c are graphs of voltages used to illustrate one mode of operating the second converter of FIG. 7a;

DETAILED DESCRIPTION OF THE PREFERRED EMBODIMENTS

First Embodiment

Figure 1:
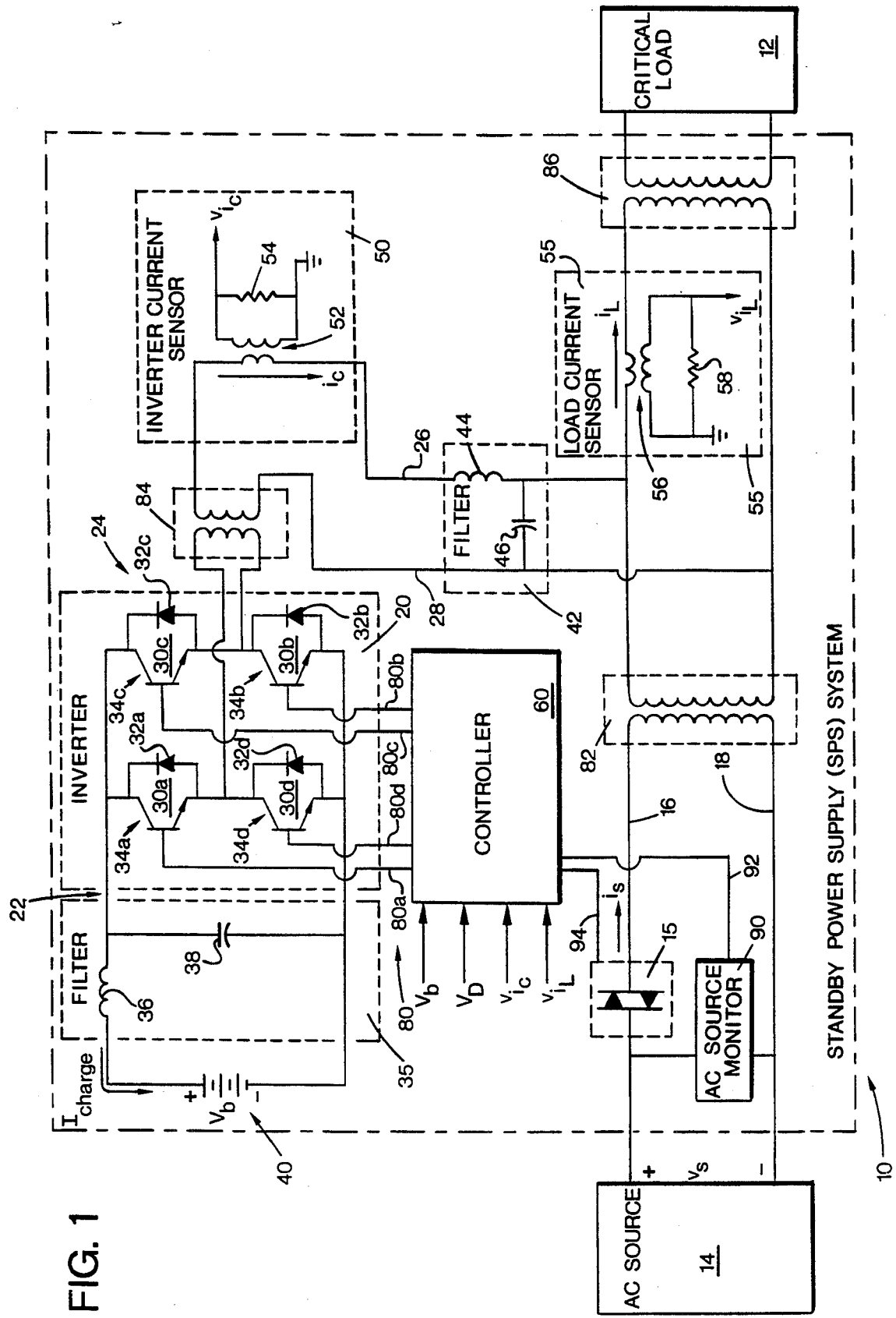
FIG. 1 is a schematic block diagram of one form of a standby power supply system of the present invention.

FIG. 1 illustrates a first embodiment of a standby power supply (SPS) system 10 constructed in accordance with the present invention for supplying power to a critical load 12. The SPS system 10 receives AC power from an AC power source 14, such as a utility system. The AC source 14 provides single-phase power at a voltage of $v_s$, such as a nominal rating of 120 volts AC, at the system frequency or line-frequency, such as 60 Hz, and with an AC source current designated $i_s$. An isolation device or switch, such as a bidirectional current semiconductor switch or static interrupter 15, in series with a conductor 16 normally conducts, allowing conductors 16 and 18 to supply AC input power to the critical load 12 from the AC source 14.

The SPS system 10 includes power conversion means, such as a power conversion device which may include an inverter, illustrated as a four quadrant switch-mode inverter 20, for supplying emergency AC power to the load 12 during failure of the AC power source 14. The inverter 20 has a DC side indicated generally as 22, and an AC side indicated generally as 24. Power may flow in either direction through the inverter 20, that is from the AC side 24 to the DC side 22 or vice versa, in a manner described further below. The AC side 24 of the inverter is coupled in parallel with the AC source 14 and the critical load 12 by conductors 26, 28 interconnecting with the respective conductors 16, 18.

The illustrated four quadrant inverter 20 has first, second, third and fourth switch-diode combinations 30a, 30b, 30c and 30d, respectively. Each switch-diode combination has a diode in parallel with a semiconductor switch, such as a transistor. The first switch-diode combination 30a has a diode 32a in parallel with the collector and emitter of transistor 34a; the second combination 30b has a diode 32b in parallel with the collector and emitter of transistor 34b; the third combination 30c has a diode 32c in parallel with the collector and emitter of transistor 34c; and the fourth combination 30d has a diode 32d in parallel with the collector and emitter of transistor 34d. Each transistor 34 turns on in response to a controller signal received by the base of the transistor, allowing current to flow through the transistor.

A first high frequency filter 35, comprising an inductor 36 and capacitor 38, couples the DC side 22 of inverter 20 with a back-up power source, such as a DC voltage device comprising a battery bank or battery 40. The filter 35 operates as a high frequency filter to remove ripple from the DC waveform supplied by the inverter. A second high frequency filter 42, comprising inductor 44 and capacitor 46, couples the AC side 24 of inverter 20 with the AC source 14 and critical load 12. The second filter 42 removes any unwanted frequencies produced by the inverter, such as those frequencies originating from the switching of transistors 34a, 34b, 34c and 34d.

The SPS system 10 includes harmonic distortion sensor means, such as a harmonic current sensor, for sensing a harmonic distortion current component $i_{dis}$ of the load current $i_L$ (see Equation 1 below). The illustrated harmonic distortion sensor means includes an inverter current sensor 50 located to the inverter AC side 24 of inverter 20. The sensor 50 is of a type which senses the AC inverter current $i_c$ produced by inverter 20. The inverter current sensor includes a transformer 52 having a primary winding in series with conductor 26 and a secondary winding in parallel with a resistor 54. In response to the inverter current $i_c$, the sensor 50 produces an inverter current sensor signal $v_{ic}$ which is the voltage across resistor 54.

In the illustrated embodiment, the harmonic distortion current sensor means also includes a load current sensor 55 located in series with the critical load 12. The sensor 55 is of a type which senses the AC load current $i_L$ drawn by the load 12. The illustrated load current sensor 55 includes a transformer 56 having a primary winding in series with conductor 16 and a secondary winding in parallel with a resistor 58. In response to the load current $i_L$, the sensor 50 produces an inverter current sensor signal $v_{iL}$ which is the voltage across resistor 58. The resistors 54 and 58, as well as transformers 52 and 56, are coordinated to produce sensor signals having the same relative magnitude as the respective associated current signals which the sensors 50 and 55 monitor.

The SPS system 10 has control means, such as a controller 60, for controlling the power conversion means and other functions of the SPS system. The controller 60 may be an analog or digital device, such as a computer, microprocessor or the like. The controller 60 receives the prevailing battery voltage signal $V_b$ from the battery 40, the desired battery voltage level $V_D$ (which may be a preset value), the inverter current sensor signal $v_{ic}$ from the inverter current sensor 50, and the load current sensor signal $v_{iL}$ from the load current sensor 55. The SPS system 10 operates in one manner under normal conditions, that is when the AC source 14 has a source voltage $v_s$ within an acceptable range. Under emergency conditions, when the source voltage $v_s$ collapses, for instance due to a power outage or other failure of the utility system, the SPS system operates in another manner. Normal operation will be discussed first.

A. Normal Operating Conditions

When the AC source voltage $v_s$ from the AC power source 18 is within an acceptable range, the static interrupter 15 in line 16 conducts to allow the source current $i_s$ to flow in both directions. Thus, the source voltage $v_s$ of the AC source 14 is applied across the critical load 12. The load current $i_L$ drawn by the critical load 12 is sensed by the load current sensor 55. The load current $i_L$ comprises two components, a line frequency current component $i_l$ which is at the same frequency as the frequency of the AC source 14, and a harmonic distortion current component $i_{dis}$:

$$i_L = i_l + i_{dis} \quad (1)$$

The distortion current component $i_{dis}$ in Equation (1) comprises harmonics of the fundamental line frequency, such as 60 Hz. The load current sensor 55 produces the load current sensor signal $v_{iL}$ as a voltage signal proportional to the measured load current $i_L$. Therefore:

$$v_{iL} = v_{il} + v_{idis} \quad (2)$$

Figure 2:
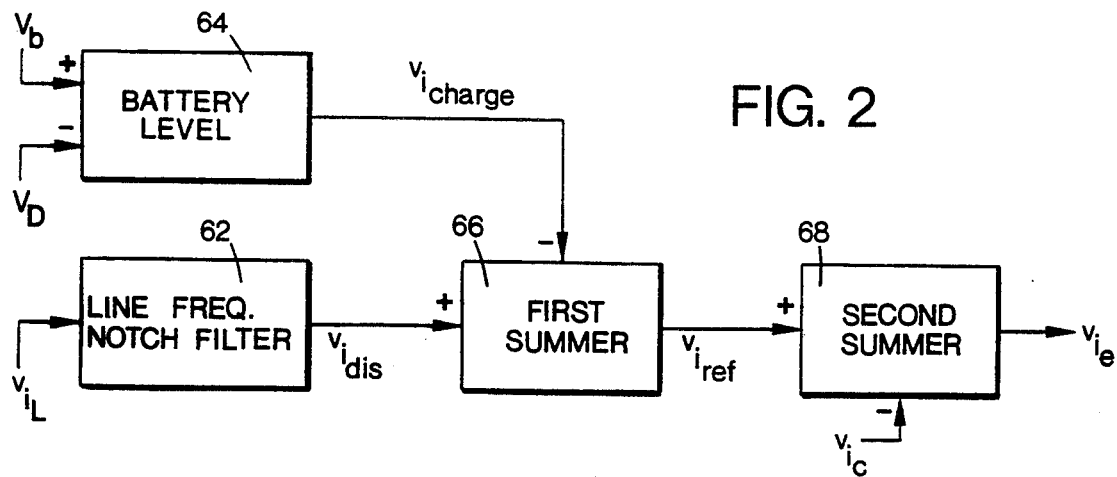
FIG. 2 is a block diagram of one form of a portion of a controller of the standby power supply system of FIG. 1.

Referring to FIG. 2, a portion of controller 60 of FIG. 1 is shown including a line frequency notch filter 62. The notch filter 62 receives the load current sensor signal $v_{iL}$ from the load current sensor 55. The notch filter 62 is sharply tuned to remove a line frequency current component signal $v_{il}$ of Equation (2) which is proportional to the line frequency current component $i_1$, of Equation (1). Thus, the notch filter 62 output signal is essentially the distortion current component signal $v_{idis}$ of Equation (2), which is proportional to the distortion current component $i_{dis}$ of the load current in Equation (1).

Referring to FIG. 1, the inverter 20 supplies a DC charging current $I_{charge}$ to bring the prevailing battery voltage $V_b$ to a desired voltage level $V_D$ (see FIG. 2). This battery charging function may be accomplished in any known conventional manner. For example, using a computer or a microprocessor (not shown), the prevailing battery voltage $V_b$ may be compared with a list in a look-up table electronically stored therein to determine the charging current $I_{charge}$ required to bring the prevailing battery voltage $V_b$ to the desired voltage level $V_D$, for example, 200 volts DC. This 200 $V_{DC}$ rating advantageously provides an emergency inverter AC output for the SPS system 10 which matches the 120 $V_{Ac}$ power normally provided by the utility AC source 14.

To accomplish this function, the controller 60 may include a battery voltage level governing device 64. However, it is apparent that the governing device 64 could also be a device separate from controller 60. Preferably, the governing device 64 is of a type which senses a prevailing battery voltage $V_b$ and determines therefrom the charging current $I_{charge}$. The governing device 64 also provides a battery charging current sensor signal $v_{icharge}$ which is proportional to the required charging current $I_{charge}$, with the proportionality as referred to the AC side 24 of the inverter being the same as that provided by the load current sensor 55.

As mentioned above, the critical load 12 produces undesirable current harmonics which can adversely affect the AC source 14 and other loads also receiving power from the AC source 14. To neutralize these undesirable current harmonics, controller 60 controls the inverter 20, as described further below, to supply a harmonics neutralizing current of the same amplitude but opposite polarity to that of the distortion current component $i_{dis}$ of the load current in Equation (1).

Additionally, the inverter 20 charges the battery bank 40 with the DC charging current $I_{charge}$, which may be referred to the inverter AC side 24 as a charging current $i_{charge}$. Thus, the inverter 20 provides an inverter current $i_c$ at the AC side 24 which equals the sum of the distortion current component and the charging current. That is, $i_c = i_{dis} - i_{charge}$, where the direction of the charging current referred to the AC side 24 of the inverter, $i_{charge}$, is assumed to be positive into the AC side 24 of the inverter 20. The charging current $i_{charge}$ is assumed sinusoidal, in phase, and at the same frequency as the AC source voltage $v_s$ to make the equations herein mathematically correct, that is, with the voltage and current having the same frequency and being in phase.

The inverter 20 is forced by controller 60 to provide an inverter current $i_c$ substantially equal to a desired inverter current or reference current $i_{ref}$, which may be written as:

$$i_{ref} = i_{dis} - i_{charge} \quad (3)$$

The amplitude of the charging current $i_{charge}$ depends upon the charge state of the battery bank 40 as determined by governing device 64 from the prevailing and desired battery voltages $V_b$ and $V_D$, respectively.

Referring again to FIG. 2, the controller 60 has a first summer 66 which receives the charging current sensor signal $v_{icharge}$ from the battery level governing device 64. The first summer also receives the distortion current component signal $v_{idis}$ from the notch filter 62. The summer 66 removes the charging current sensor signal $v_{icharge}$ from the distortion current signal $v_{idis}$ by adding $v_{icharge}$ with a negative polarity to $v_{idis}$ to provide a reference current signal $v_{iref}$ that is:

$$v_{iref} = v_{idis} - v_{icharge} \quad (4)$$

In Equation (4), the reference current signal $v_{iref}$ is proportional to the reference current $i_{ref}$ of Equation (3).

To instantaneously force the inverter current $i_c$ of FIG. 1 to be equal to the reference current $i_{ref}$ of Equation (3), the inverter current sensor 50 monitors the inverter current $i_c$. In response to the sensed inverter current $i_c$, the sensor 50 produces the inverter current sensor signal $v_{ic}$. The sensor signal $v_{ic}$ is proportional to the inverter current $i_c$ with the same proportionality of that provided by the load current sensor 55 and the battery level governing device 64.

The controller 60 has a second summer 68 shown in FIG. 2 which receives the reference current signal $v_{iref}$ from the first summer 66. The second summer 68 also receives the inverter current sensor signal $v_{ic}$ from the sensor 50. The second summer 68 removes the inverter current signal $v_{ic}$ from the reference current signal $v_{iref}$ by adding $v_{ic}$ with a negative polarity to $v_{iref}$ to produce an output signal comprising an error signal $v_{ic}$, that is:

$$v_{ic} = v_{iref} - v_{ic} \quad (5)$$

The error signal $v_{ic}$ is proportional to the error between the reference current $i_{ref}$ and the inverter current $i_c$.

The controller 60 uses the error signal $v_{ic}$ produced by summer 68 to produce an inverter control signal 80 to control inverter 20 by controlling the switching of the transistors 34a–34d. There are a variety of sophisticated approaches which are suitable to control the illustrated switch mode inverter 20. In one simplified approach, the transistors 34a and 34b are operated as a first group of switches, while the transistors 34c and 34d are operated as a second group of switches. The two switches in each group are turned on or turned off simultaneously. For this type of inverter operation, two types of inverter control are illustrated, with one being a tolerance band control system and the other a fixed frequency control system.

Figure 3:
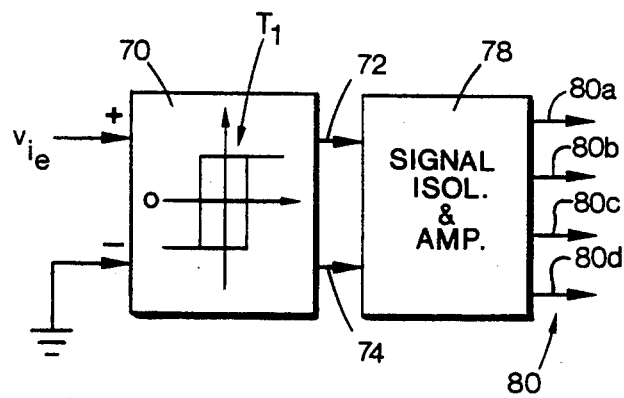
FIG. 3 is a block diagram of one form of another portion of the controller of the standby power supply system of FIG. 1.

For the tolerance band control system shown in FIG. 3, the controller 60 includes a tolerance band controller, such as a comparator 70. The comparator 70 includes a tolerance or hysteresis band $T_1$ (illustrated schematically in FIG. 3). The comparator 70 compares the error signal $v_{ic}$ with the values defined by the tolerance band $T_1$. If the value of the error signal exceeds the tolerance band $T_1$, the status of the inverter transistors 34a–34d is changed, depending on the polarity of the error signal $v_{ic}$. The output of the tolerance band controller 70 comprises first and second gate signals 72 and 74.

Figure 4:
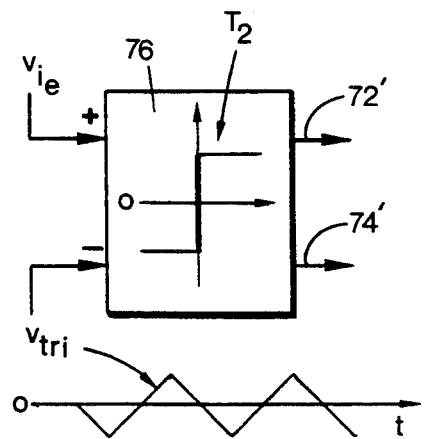
FIG. 4 is a block diagram of an alternate to a portion of the diagram shown in FIG. 3.

Alternatively, the inverter control signal 80 may be produced by controller 60 having a fixed frequency controller, such as a comparator 76 shown in FIG. 4. The comparator 76 receives the error signal $v_{ic}$ from the second summer 68. The comparator also receives a triangular waveform signal $v_{tri}$ having a constant amplitude and preferably a fixed frequency. The comparator 76 has a very small hysteresis or tolerance band $T_2$ (when compared to $T_1$) which is mainly used to provide a noise immunity to the output current of inverter 20. Noise immunity refers to the tendency of a switching device, such as the transistors of inverter 20, to undesirably change state in response to noise in the control signal, instead of changing state at the desired time established by controller 60.

The comparator 76 subtracts the triangular waveform $v_{tri}$ as indicated by the minus sign, from the error signal $v_{ic}$ to provide a resulting difference signal. The comparator compares this difference signal with the tolerance band $T_2$ to detect and determine the polarity of the difference signal. When this resulting value exceeds the tolerance band $T_2$, the transistors 34a–34d change state, depending upon the polarity of the resultant value, to bring the difference signal within the tolerance band $T_2$. Thus, the frequency of the triangular waveform $v_{tri}$ establishes an inverter switching frequency at which the transistors 34a–34d respond. The fixed frequency controller 76 provides alternate first and second gate signals 72' and 74' to those provided by the tolerance band controller of FIG. 3. In this manner, the inverter current $i_c$ is driven to follow the reference current $i_{ref}$ to adequately charge the battery bank 40 and to substantially neutralize the undesirable harmonic load currents.

The controller 60 also includes signal conditioning means, such as the conventional signal isolation and amplification device or signal conditioner 78 illustrated in FIG. 3. The signal conditioner 78 receives the first and second gate signals 72, 74 from the tolerance band controller comparator 70 in the embodiment of FIG. 3. Alternatively, if the fixed frequency controller comparator 76 of FIG. 4, is used, the alternate first and second gate signals 72' and 74' are received and conditioned by the signal conditioner 78.

From the first and second gate signals (72, 74 or 72', 74'), the signal conditioner 78 provides the inverter control signal 80, comprising transistor drive signal components or gate signals 80a, 80b, 80c and 80d. The gate signals 80a, 80b, 80c and 80d are received by the bases of the respective transistors 34a, 34b, 34c and 34d of the inverter 20. Thus, the error signal $v_{ic}$ of Equation (5) is used by the controller 60 to generate the inverter control signal 80. There are several ways to generate the gate signals 80a–80d which may be found in a variety of textbooks, such as the book, *Power Electronics: Converters, Applications and Design*, by Mohan, Robbins and Undeland, John Wiley Publisher, 1989.

To control the inverter current $i_c$ and force it to be substantially equal to the reference current $i_{ref}$, it is preferable that the desired DC voltage $V_D$ of the battery bank 40 be greater than the peak value of the AC source voltage $v_s$ of the AC source 14 by a given margin. For example, this margin may be 10% of the peak value of the AC source voltage $v_s$ maximum value, such as five percent over the rated source voltage $v_s$. This margin advantageously assists in controlling the inverter current $i_c$ to follow the reference current $i_{ref}$ by providing a higher voltage to the inverter side of the filter capacitor 46 than across the AC source and load side of capacitor 46.

Referring again to FIG. 1, the high frequency filter 35 to the DC side 22 of inverter 20 bypasses the high frequency current components or ripple from inverter 20 around the battery bank 40. Thus, the battery bank 40 does not receive these high frequency current components. The high frequency filter 42 on the inverter AC side 24 prevents the high switching frequency currents produced by inverter 20 from being applied to the critical load 12 and the AC source 14. However, any waveform distortion of the power received from the AC source 14 may also be experienced by the load 12.

The inductance of the filter inductor 44 influences the switching frequency for a selected tolerance band $T_1$ or $T_2$. The lower the inductance of the filter inductor 44, the faster the switching may occur as known from the familiar equation, $v=(L)(di/dt)$. Referring to FIG. 3, the inductance of inductor 44 directly influences the switching frequency of the tolerance band controller 70. This is true since the switching frequency for controller 70 is not constant, and switching only occurs when the error signal $v_{ic}$ exceeds the band $T_1$. Referring to FIG. 4, the inductance of inductor 44 only influences the switching frequency ripple of the inverter current $i_c$ in the fixed frequency controller 76 for a selected switching frequency. This follows since the switching frequency of controller 76 is the frequency of the triangular waveform $v_{tri}$. The transistors 34a–34d change state when the tolerance band $T_2$ is exceeded by the difference between the error signal $v_{ic}$ and the triangular waveform $V_{tri}$.

Referring back to FIG. 1, optionally the SPS system 10 may also include plural isolation transformers, each operating at the system frequency of the AC power source 14. For example, a first isolation transformer 82 may be located across conductors 16 and 18 between the AC source 14 and the inverter 20. A second isolation transformer 84 may be located across lines 26 and 28 between the inverter 20 and the inverter current sensor 50. A third isolation transformer 86 may be located across conductors 16 and 18 between the load current sensor 55 and the load 12.

B. Emergency Operating Conditions

During an emergency condition, the source voltage $v_s$ collapses due to some failure of the AC source 14. The SPS system 10 may include source monitoring means, such as an AC source monitor 90 connected in parallel with the AC source 14 across conductors 16 and 18. When $v_s$ collapses below a predetermined acceptable value, for example, eighty percent of the rated voltage, the monitor 90 detects this failure. The monitor 90 may also include conventional hysteresis or a deadband to accommodate momentary faults in the AC source 14 without causing the SPS system 10 to enter an emergency mode of operation. While the monitor 90 is shown as an independent component, it is apparent that the source monitoring means may be incorporated within the static interrupter 15 or within the controller 60.

When an AC source failure is detected by the monitor 90, an AC source failure signal 92 is delivered to the controller 60. The controller 60 controls the static interrupter 15 with a static interrupter control signal 94 which comprises a disconnect signal when the AC source fails. In response to the disconnect signal, the static interrupter 15 turns-off to disconnect and isolate the SPS system 10 and load 12 from the AC source 14. Alternatively, the monitor 90 may send a disconnect signal (not shown) directly to the static interrupter 15. The controller 60 then controls the inverter 20 in a conventional manner as a conventional pulse width modulated (PWM) inverter operating in a voltage mode. In this fashion, the inverter 20 supplies AC emergency power having a nearly sinusoidal voltage to the critical load 12, using power supplied by the battery bank 40.

C. Operation

In operation, the SPS system 10 operates in two modes, with one being under normal operating conditions, and the other being under emergency operating conditions. From the following discussion, a method of supplying AC power to the load 12 during both of these conditions is also covered.

During normal operating conditions, using an SPS system 10 which may be as described above, the static interrupter 15 conducts to couple the AC power source 14 with the SPS system 10 and with the critical load 12. The load current $i_L$ supplied to the load 12 is sensed with the load current sensor 55 which produces in response thereto the load current sensor signal $v_{iL}$. The notch filter 62 removes the line frequency component $i_l$ supplied by the AC source 14 from the load current $i_L$ to provide the distortion current signal $v_{idis}$, corresponding to the undesirable load current harmonic components $i_{dis}$ (see Equations 1 and 2). The inverter 20 draws power from the AC source 14 and produces the inverter current $i_c$ in response to the inverter control signal 80 received from controller 60. The inverter current sensor 50 senses the inverter current $i_c$ and produces in response thereto the inverter current sensor signal $v_{ic}$.

The controller 60 controls the inverter 20 in response to the inverter current sensor signal $v_{ic}$ and the load current sensor signal $v_{iL}$, by producing the inverter control signal 80, as described further below, to substantially neutralize the undesirable harmonic currents produced by the load 12. The controller 60 controls the inverter 20 to force the inverter current $i_c$ to be equal to the reference current $i_{ref}$. Referring to Equation (3), the reference current $i_{ref}$ includes the harmonic current distortion component $i_{dis}$ and the battery charging current component $I_{charge}$, referred to the inverter AC side 24 as $i_{charge}$. The charging current is sensed and controlled by the battery voltage governing device 64 which in response thereto produces the charging current sensor signal $v_{icharge}$.

The first summer 66 of controller 60 produces the current reference signal $v_{iref}$ by removing the charging current sensor signal $v_{icharge}$ from distortion current signal $v_{idis}$ by adding $v_{icharge}$ with a negative polarity to $v_{idis}$. The second summer 68 produces the error current signal $v_{ic}$ by removing the inverter current sensor signal $v_{ic}$ from the current reference signal $v_{iref}$ by adding $v_{ic}$ with a negative polarity to $v_{iref}$.

The controller 60 may be provided with either the tolerance band controller 70 of FIG. 3 or with the fixed frequency controller 76 of FIG. 4. When the tolerance band controller 70 is used, the method of the present invention may also include the steps of comparing the error current signal $v_{ic}$ from the second summer 68 with the tolerance band $T_1$. In a changing step, the inverter control signal 80 is varied by the controller 60 to return the error current signal $v_{ic}$ to a value within the tolerance band $T_1$ when $v_{ic}$ exceeds band $T_1$.

For a controller 60 provided with the fixed frequency controller 76 of FIG. 4, the method of the present invention may also include the steps of providing the triangular waveform signal $v_{tri}$ to the controller 76. Preferably, the $v_{tri}$ signal is provided at a constant amplitude and frequency. The constant triangular waveform signal frequency is used for establishing an inverter switching frequency for the inverter control signal 80. The controller 76 compares the error current signal to the $v_{ic}$ with the triangular waveform signal $v_{tri}$ to provide a difference signal. The comparator 76 determines and detects the polarity of the difference signal by comparing it with the tolerance band $T_2$. In response to the difference signal of comparator 76, the controller 60 changes the inverter control signal 80 to return this different signal to within the tolerance band $T_2$.

The signal conditioner 78 receives and conditions the first and second gate signals, 72 and 74 from tolerance band controller 70, or alternatively 72' and 74' from the fixed frequency controller 76. From these gate signals, the conditioner 78 provides the transistor drive signals 80a–80d of the inverter control signal 80 to drive the inverter transistors 34a–34d. The controller 60 changes the drive signals 80a–80d to maintain an adequate charge on battery bank 40 while substantially neutralizing undesirable harmonic currents produced by the load 12.

In this manner, a sinusoidal current is drawn from the AC source 14. Any harmonic currents required by the load 12 are neutralized by the SPS system 10 which supplies harmonic distortion current components of the same magnitude but opposite polarity of the load current harmonics. Advantageously, other loads in the vicinity supplied by the AC source 14 are not adversely affected by the harmonic current distortion of the load 12. The SPS system 10 has fewer components than many known UPS and SPS systems, and thus, suffers fewer component failures. The control system of controller 60 may be implemented by analog, digital or microprocessor techniques.

During emergency operating conditions, when $v_s$ collapses due to a utility outage of source 14, the static interrupter 15 isolates the SPS system 10 and load 12 from the AC source 14. The controller 60 then controls the inverter 20 as a conventional pulse width modulated (PWM) inverter operating in a voltage mode. In this fashion, the battery bank 40 supplies power through the inverter 20 to the critical load 12 to maintain load operation during the emergency.

Second Embodiment

FIGS. 5 through 9 illustrate a second embodiment of a standby power supply (SPS) system comprising a high frequency (HF) link SPS system 100 constructed in accordance with the present invention. The HF-link SPS system 100, as described further below, has several advantages over the embodiment of FIGS. 1–4. For example, the HF-link SPS system 100 may be used with a battery having a lower DC bus voltage level rating than that of the FIG. 1 embodiment. This lower DC bus voltage is safer for repair personnel to work around and provides higher battery reliability. Furthermore, a lower EMI (electromagnetic interference) may be realized using this embodiment, as described further below. Also, the HF-link SPS system 100 may run quieter since it is capable of operation at a frequency above the audible frequency range.

The HF-link SPS system 100 supplies power to a critical load 102, which may be as described above for the critical load 12 of FIG. 1. The HF-link SPS system 100 receives AC power from an AC power source 104, which may be as described above for AC power source 14. The HF-link SPS system 100 includes an AC source monitor 106, which may be as described above for the AC source monitor 90, to monitor the power received from the AC source 104 and to facilitate the transition between normal and emergency operating conditions.

An optional isolation transformer 108 operating at the system frequency of the AC source 104 may be included. An isolation device or switch, such as a static interrupter 110, which may be as described above for interrupter 15, normally conducts to supply power to the critical load 102. Another isolation transformer 112, also operating at the system frequency, may be included to provide protection between the HF-link SPS system 100 and the critical load 102.

The HF-link SPS system 100 has a backup power source, such as a DC voltage device comprising a battery bank or battery 114. In this embodiment, the battery 114 may advantageously may be rated at a lower DC voltage than the battery bank 40 of FIG. 1. For example, battery bank 40 may be rated at a desired voltage on the order of 200 $V_{DC}$, whereas battery 114 may be rated on the order of 48 $V_{DC}$.

The battery 114 is coupled to the AC source 104 and critical load 102 by power conversion means, such as a power conversion device including a first converter 116, a high frequency (HF) isolation transformer 118, and a second converter 120. The power conversion means includes a high frequency (HF) link, comprising the interface of the first and second converters 116 and 120. This power conversion means and the battery 114 are shown in more detail in FIG. 6, which includes a plurality of filters omitted for simplicity from FIG. 5.

Figure 6:
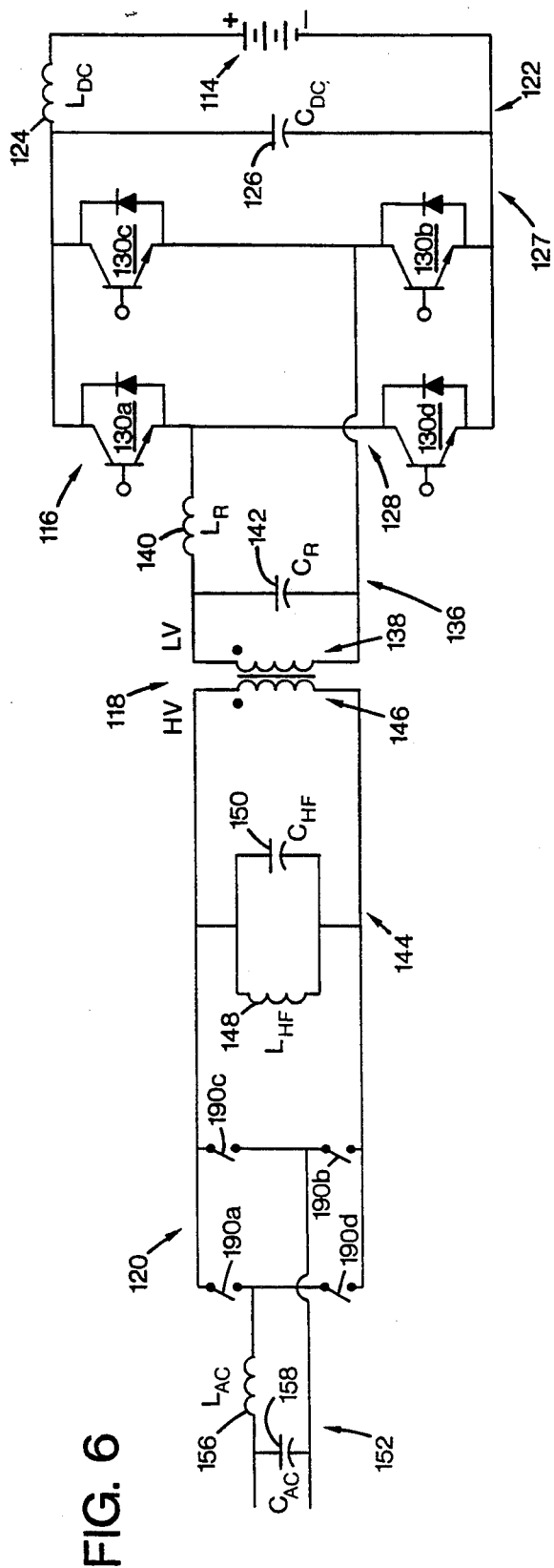
FIG. 6 is a schematic diagram of a portion of the high frequency link standby power supply system of FIG. 5.

Referring to FIG. 6, a DC filter 122 couples the battery 114 with the first converter 116. The DC filter 122 includes an inductor 124 having an inductance $L_{DC}$, and a capacitor 126 having a capacitance $C_{DC}$. The filter 122 may operate as described above for filter 35 to remove ripple from the DC waveform supplied by the first converter 116 to charge the battery 114.

The first converter 116 is illustrated as a switch-mode converter having a DC side 127 and an AC side 128. The power flow through converter 116 is bidirectional, that is from the AC side 128 to the DC side 127 and vice versa. In the illustrated embodiment, the converter 116 may be constructed as described above for the inverter 20 but operated according to a different manner of control. The illustrated converter 116 has identical first, second, third and fourth switch-diode combinations 130a, 130b, 130c and 130d, respectively. For example, the first switch-diode combination 130a has a diode 132a in parallel with a semiconductor switch, such as a transistor 134a, with the collector and emitter of transistor 134a being in parallel with diode 132a. In the illustrated embodiment, the item numbers of the switch-diode combinations, diodes and transistors for converter 116 are one hundred more than the item numbers of the switch-diode combinations, diodes and transistors, respectively, for inverter 20.

A resonant tank 136 couples the AC side 128 of converter 116 with a low voltage side 138 of the HF-isolation transformer 118. The resonant tank 136 includes an inductor 140 having an inductance $L_R$, and a capacitor 142 having a capacitance $C_R$. The HF-link may be chosen to operate at a high link frequency $f_{HF}$, for example 20 kHz, which is established by the switching frequency of the first converter 116. Preferably, the converter 116 operates at a 0.5 duty-ratio. This configuration provides a high frequency AC voltage across the low voltage side 138 of transformer 118. The resonant frequency $f_0$ of the resonant tank 136 is:

$$f_0 = \frac{1}{2\pi \sqrt{L_R C_R}}$$

The components and variables of the system may be chosen such that the first converter 116 operates at a link frequency $f_{HF}$ greater than the resonant frequency $f_0$, i.e., $f_{HF} > f_0$.

A high frequency (HF) link filter 144 couples a high voltage side 146 of transformer 118 with the second converter 120. The filter 144 includes an inductor 148, having an inductance $L_{HF}$, in parallel with a capacitor 150 which has a capacitance $C_{HF}$. The components of the HF-link filter 144 may be chosen such that filter 144 is parallel resonant at the frequency $f_{HF}$ established by the first converter 116. That is:

$$f_{HF} = \frac{1}{2\pi \sqrt{L_{HF} C_{HF}}}$$

The advantages of these particular selections will be described below.

A third filter 152 may be included between the second converter 120 and a parallel junction 154 (see FIG. 5) of the second converter 120 with the critical load 102 and the input from the AC source 104. The filter 152 includes an inductor 156 having an inductance $L_{AC}$, and a capacitor 158 having a capacitance $C_{AC}$. The filter 152 operates as described above for filter 42 to remove any unwanted frequencies produced by the second converter 120.

Referring again to FIG. 5, the HF-link SPS system 100 has control means, such as a controller 160, for controlling the power conversion means and other functions of the system. For example, the controller 160 receives an AC source monitor signal 162 from the AC source monitor 106, and in response thereto controls the static interrupter 110 with a static interrupter control signal 164. This manner of monitoring the AC source 104 and controlling the interrupter 110 may be as described above with respect to controller 60, monitor 90 and interrupter 15.

The HF-link SPS system 100 has harmonic distortion sensor means for sensing a harmonic distortion current component of a load current $i_{load}$ drawn by the critical load 102 during normal operating conditions. For simplicity, the various sensor means of the illustrated embodiment are shown in FIG. 5 and omitted from FIG. 6. In the illustrated embodiment, the harmonic distortion sensor means comprises converter current sensor means, such as an inverter current sensor 166, and load current sensor means, such as a load current sensor 168. The converter current sensor 166 senses an output current $i_{conv}$ of the second converter 120 supplied to the parallel junction 154. The load current sensor 168 senses the load current $i_{load}$. The converter current sensor 166 provides a converter current sensor signal 170 to controller 160, and the load current sensor 168 provides a load current sensor signal 172 to the controller 160. The converter and load current sensors 166 and 168 may be as described above for the respective inverter and load current sensors 50 and 55.

Another input to the controller 160 is provided by polarity sensor means, such as a polarity sensor 174, for sensing the polarity on the high voltage side 146 of the HF-isolation transformer 118. The polarity sensor 174 provides a high frequency polarity sensor signal 176 to the controller 160. The polarity sensor 174 is useful in determining the zero-crossings of the high frequency voltage received by the second converter 120 from the transformer 118.

The converter 120 has a bidirectional power flow therethrough, and the voltages on each side of the second converter 120, that is toward the parallel junction 154 and toward transformer 118, are bipolar or alternating in nature. Although the power flow is clearly bidirectional, the output of converter 120 toward the parallel junction 154 is described herein as an output voltage $v_{out}$ and an output current $i_{conv}$. For sensing the second converter output voltage $v_{out}$, converter output voltage sensor means, such as a converter output voltage sensor 178, are provided. In the illustrated embodiment, sensor 178 provides a sensor signal 180 having magnitude, frequency and polarity information about the output voltage $v_{out}$. It is apparent that in some embodiments the high frequency polarity sensor 174 may be as described for the output voltage sensor 178.

For the purposes of discussing the illustrated embodiment, the second converter 120 is described as having the output current and voltage, $i_{conv}$ and $v_{out}$, provided to the parallel junction 154. However, the bidirectional operation of converter 120 is used in conjunction with the first converter 116 to charge the battery 114 during normal operation. The output current and voltage, $i_{conv}$ and $v_{out}$, are useful in describing both emergency operation of the HF-link SPS system 100 and normal operation, wherein the power conversion means produces a harmonics neutralizing current in a manner described further below.

In response to the inputs described above, the controller 160, which may be as described above for controller 60, controls the first converter 116 with a first converter control signal 182. Signal 182 comprises four transistor drive signal components or gate signals 182a, 182b, 182c and 182d for controlling the switching of transistors 134a, 134b, 134c and 134d, respectively. The controller 160 also controls the second converter 120 with a second converter control signal 184. Signal 184 comprises four switching control signals 184a, 184b, 184c and 184d for controlling the second converter as described further below.

A suitable construction and manner of operating the second converter 120 is illustrated in FIGS. 7A–7B and 8A–8C. In FIG. 7A, the voltage received by converter 120 from the HF-isolation transformer 118 is illustrated schematically as an AC voltage source 186 providing an input or link voltage $v_{in}$. The converter 120 includes four switch assemblies 190a, 190b, 190c and 190d arranged in a bridge configuration and illustrated schematically in FIGS. 6 and 7A. Bidirectional power flow through the second converter 120 may be accomplished by using bidirectional current switches. For example, two unidirectional switches may be connected with reverse blocking capability in antiparallel.

A simpler way to obtain a bidirectional-current switch with voltage blocking capability of both polarities is illustrated as switch assembly 190 in FIG. 7B, suitable for each switch assembly 190a through 190d. The switch assembly 190 includes four diodes 191, 192, 193 and 194 interconnected as shown with a single switch, such as a MOSFET 196. The MOSFET switch 196 turns on (conducts) in response to the appropriate one of the components of the second converter control signal 184, e.g., switch assembly 190a having a MOSFET 196a (not shown) would operate in response to the second converter control signal 184a. In this manner, the second converter 120 may provide an interface between the high frequency AC voltage from transformer 118 and the sinusoidal line frequency (e.g., 60 Hz) voltage of the AC source 104.

To produce a desired output voltage $v_{out}$, the second converter may be operated in a variety of different ways. For example, the converter 120 may be operated in an integral-half cycle mode as described in NASA Contractor Report No. 179600, prepared for the Lewis Research Center under Grant No. NAG3-631, entitled "Study of Generator/Motor Operation of Induction Machines in a HF-link Space Power System," by T. A. Lipo and P. K. Sood, published in March 1987. The substance of the applicable points from the NASA report are covered in a 1987 APEC/IEEE publication by P. K. Sood, T. A. Lipo, and I. G. Hansen entitled "A Versatile Power Converter for HF-Link Systems," pp. 249–56.

In the integral-half cycle mode, the switches 190a–190d of converter 120 are turned on or off when the link voltage $v_{in}$, represented by source 186, passes through zero, that is, when there is a zero-crossing of the voltage waveform. The zero-crossings of the waveform of the link voltage $v_{in}$, shown in FIG. 8A, are detected by the high frequency polarity sensor 174 (see FIG. 5). For each cycle of the HF-isolation transformer 118, the link voltage crosses through zero twice per cycle. Switching losses are advantageously reduced by switching the switches 190a through 190d of the converter 120 at the zero-crossing points. In this manner, switching losses are minimized and the required current handling capability of each switch assembly 190 is reduced. This advantageously allows for minimizing the size of the switch assemblies used, thus providing a more economical HF-link SPS system 100. Furthermore, switching related device voltage stresses may also be minimized with this approach, increasing the reliability of the HF-link SPS system 100.

A low-frequency AC voltage, e.g., the line frequency of 60 Hz, may be synthesized with a modulation scheme based on an area comparison concept, often called the area-compensation pulse-density-modulation (AC-PDM) method. For illustration, a desired sinusoidal output voltage or reference signal $v_{ref}$ is shown in FIG. 8B. In the AC-PDM method, the area under the waveform of the reference signal $v_{ref}$ is compared by controller 160 (as described further below) with the area under the synthesized signal, that is the waveform of the converter output voltage $v_{out}$, shown in FIG. 8C. In response to this comparison, the next half cycle of the $v_{out}$ waveform is moved above or below the zero reference or not allowed to pass through the converter at all, so the area under the $v_{out}$ waveform follows the area under the reference $v_{ref}$ waveform. Thus, the density of the half cycle pulses in the synthesized output voltage $v_{out}$ is modulated in close accordance with the amplitude of the reference signal $v_{ref}$ shown in FIG. 8B.

The converter 120 is controlled in the following fashion by the second converter control signal 184 to provide the desired waveform of the output voltage $v_{out}$. Referring to FIG. 8C, the $v_{out}$ waveform during the interval marked X is provided by driving switch assemblies 190c and 190d to be turned-on to conduct during this cycle. The $v_{out}$ waveform during the interval labelled Y is provided by driving switches 190a and 190c to conduct, or alternatively by driving switches 190b and 190d to conduct. The $v_{out}$ waveform during the interval Z is provided by driving switches 190a and 190b to conduct. It is clear that this method may be used with non-sinusoidal input waveforms $v_{in}$ received from transformer 118, such as a square wave.

During normal operation, the controller 160 has a portion, which may be identical to that shown and described above in FIG. 2 for controller 60, used for operation in a current mode. For example, the battery level governing device 64 may monitor the voltage level of battery 114 to supply the input $V_b$ to the battery level governing device 64. The load current sensor signal 172 is supplied to the line frequency notch filter 62 as $v_{iL}$. Similarly, the second converter output current sensor signal 170 is supplied to the second summer 68 as the signal $v_{ic}$. Thus, the second summer 68 may supply an error signal $v_{ic}'$, which is distinguished from the error signal of the FIG. 1 embodiment by the addition of the prime (') designator.

Figure 9:
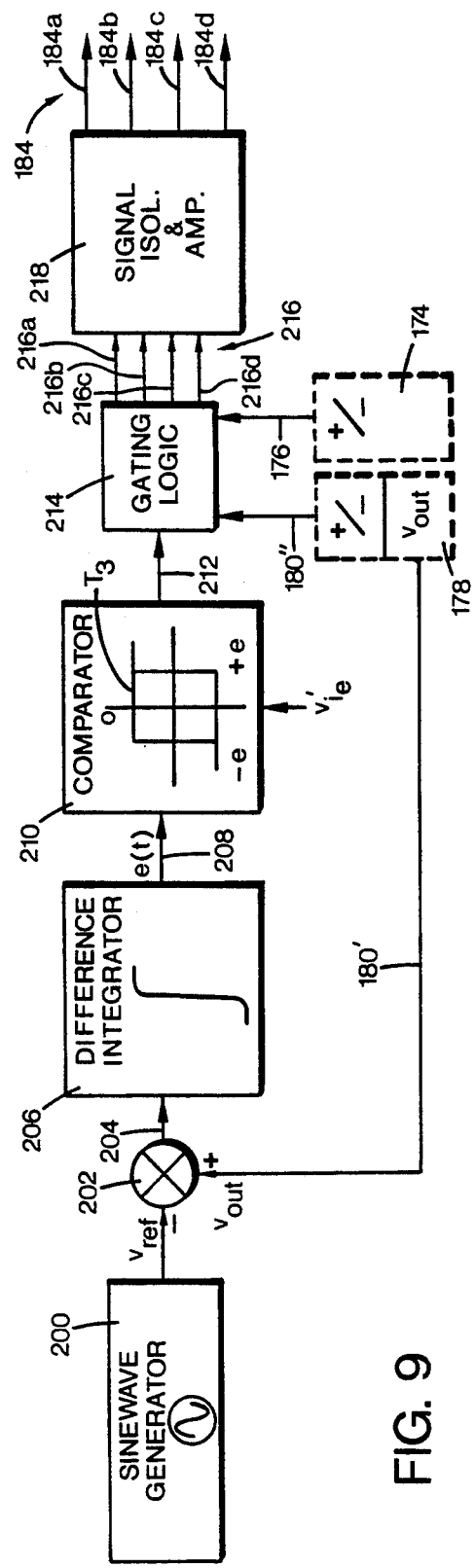
FIG. 9 is a block diagram of one form of a portion of a controller of the high frequency link standby power supply system of FIG. 5.

During emergency operation, the HF-link SPS system 100 operates in a voltage mode. One manner of generating the second converter control signal 184 is illustrated in FIG. 9, which shows a portion of the controller 160. A sinewave generator 200 generates the reference voltage signal $v_{ref}$ shown in FIG. 8B. The controller 160 includes a summer 202 which adds the reference voltage signal $v_{ref}$ with a negative polarity to an amplitude portion 180' of the converter output voltage signal 180. From this summation, the summer 202 provides a difference signal 204 to a difference integrator 206. The integrator 206 integrates the difference signal 204 to provide an area error signal e(t), also designated as 208. A tolerance band control scheme as described above with respect to FIG. 3 is used by comparator 210, which may be as described above for comparator 70, having a tolerance band $T_3$. When the area error signal 208 exceeds the tolerance band $T_3$, the comparator 210 provides a change area signal 212 to a gating logic device 214. The change area signal 212 may be an increase, decrease, or a hold-constant area signal. The gating logic device 214 decides which combinations of the switch assemblies 190a through 190d must be turned on such that the area under the $v_{out}$ waveform (FIG. 8C) synthesizes the area under the reference $v_{ref}$ waveform (FIG. 8B). These switching combinations are described above with reference to intervals X, Y and Z.

To assure switching of the converter 120 occurs at zero crossings of the voltage received from transformer 118 ($v_{in}$ of source 186 in FIG. 7A), the gating logic device 214 receives the high frequency polarity sensor signal 176 from the polarity sensor 174. The gating logic device 214 also receives a converter voltage output polarity portion 180" of the sensor signal 180 from the output voltage sensor 178. The gating logic device 214 provides a gating logic signal 216 comprising gating logic signal components 216a, 216b, 216c and 216d to a signal isolation and amplification device 218, which may be as described above for device 78 of FIG. 3. The gating logic signals are used by the signal isolation and amplification device 218 to provide the second converter controller signal 184 comprising components 184a–184d to control the respective switch assemblies 190a–190d.

Recall that the link frequency $f_{HF}$ is the frequency of transformer 118 established by the first converter 116. If the link frequency is sufficiently high, such as by a factor of twenty or greater than the frequency of the AC source 14, and if the modulation index does not exceed unity, the synthesized signals have a very low order distortion for a wide amplitude and frequency range of the synthesized signal. Furthermore, any high frequency harmonics produced by the switching of the second converter 120 only occur as the side band of the switching frequency. Thus, these high frequency converter harmonics may be eliminated by filter 152 so as not to trouble the critical load 102.

Moreover, in the illustrated HF-link SPS system 100, the high frequency link voltage $v_{in}$ is nearly sinusoidal. The switch assemblies 190a–190d of the second converter 120 change status at zero voltage, that is at the zero crossings of the $v_{in}$ waveform. Referring to FIG. 6, a link current (not shown) flows between the second converter 120 and the HF-link transformer 118. During operation, the link current can change in direction very suddenly. The capacitor 150 of the high frequency link filter 144 provides a link current path for the link current to accommodate these rapid shifts in direction. By choosing the inductance $L_{HF}$ and capacitance $C_{HF}$ of the components of filter 144 parallel resonant at the link frequency $f_{HF}$, the current drawn from second converter 120 at the link frequency $f_{HF}$ is advantageously minimized.

A. Normal Operation

When the AC source monitor 106 determines that the voltage of the AC source 104 is within acceptable limits, the static interrupter 110 conducts to provide power to the critical load 102. Any harmonic distortion current component of the load current $i_{load}$ is detected by the harmonic distortion sensor means. Here the harmonic distortion sensor means are illustrated as comprising the load current sensor 168 and the converter current sensor 166. Sensors 166 and 168 operate in conjunction with a portion of controller 160 as described above with reference to FIG. 2, to provide the error signal $v_{ic}'$.

The harmonic distortion current component is neutralized by providing to the parallel junction 154 the second converter output current $i_{conv}$ of the same amplitude and opposite polarity to that of the distortion component. The required neutralizing converter output current is provided by controlling the opening and closing of switch assemblies 190a through 190d, for example using a tolerance-band control scheme as described above with respect to FIG. 3 for the embodiment of FIG. 1. That is, above with respect to FIG. 2, is provided to the comparator 210 (see FIG. 9).

The comparator 210 receives the error signal $v_{ic}'$ from second summer 68, and operates with a tolerance band control scheme as described above with respect to FIG. 3. However, the gating logic device 214 advantageously provides for zero-crossing switching (as described above) of the switch assemblies 190 of converter 120. During normal operation, the area error signal input e(t) or 208 is not provided to the comparator 210. Rather, the comparator 210 compares the error signal $v_{ic}'$ to the tolerance band T3, and if it is outside the tolerance band provides a change area signal 212. The change area signal 212 instructs the gating logic device 214 to either increase, decrease, or maintain the area under the waveform of the output voltage $v_{out}$ (see FIG. 8C) to operate in a current mode. In the current mode of operation, the converter output current $i_{conv}$ follows the reference current signal $v_{iref}$ from the first summer 68 to provide the required harmonics neutralizing current.

The gating logic signal 216 also provides the timing of the switching for converter 120 such that switching only occurs at zero-crossings. To accomplish this, the gating logic device 214 receives inputs from the high frequency polarity sensor 174 and the polarity component 180" of the output voltage sensor 178. The gating logic device 214 provides gating logic output signals 216a through 216d to the signal isolation and amplification device 218. Device 218 then provides the second converter control signal components 184a through 184d to the switch assemblies 190a through 190d, respectively. In response to the controller signal 184, the switches 190a through 190d turn on and off to vary the current output of the second converter 120, providing a harmonic distortion neutralizing current in the normal mode of operation.

Furthermore, the controller 160 controls the switches of the first converter 116 to provide the frequency of the voltage waveform received by the second converter through transformer 118, that is the waveform of $v_{in}$ shown in FIG. 8A. Additionally, the first and second converters 116, 120 also operate in unison to charge the battery 114 to a desired voltage level $V_D$ as required by a battery level governing device such as 64 shown in FIG. 2. Charging the battery 114 may be accomplished concurrently with the neutralizing of the harmonic distortion current component of the load current $i_{load}$, as described above for the embodiment of FIG. 1.

B. Emergency Operation

When the AC source monitor 106 detects a collapse of the voltage received from the AC source 104, the controller 160 directs the static interrupter 110 to open and isolate the SPS system 100 from the source 104. At this time, the sinewave generator 200 begins generating a reference voltage signal $v_{ref}$ (FIG. 8B) to simulate the AC source voltage. The summer 202 adds the reference voltage signal $v_{ref}$ with a negative polarity to the converter output voltage signal amplitude portion 180'. The integrator 206 integrates the difference signal 204 from summer 202 to provide the area error signal e(t) 208. The comparator 210 uses the tolerance band control scheme, ignoring the error signal input $v_{ic}$, during emergency operation, since the AC source 104 has been disconnected from the HF-link SPS system 100 by the opening of interrupter 110.

When the area error signal 208 exceeds the tolerance band T3, the comparator 210 provides the change area signal 212 to the gating logic device 214 to increase, decrease, or hold the area under the $v_{out}$ waveform constant. The gating logic device 214 decides which combinations of the switch assemblies 190a through 190d must be turned on so the area under the $v_{out}$ waveform (FIG. 8C) synthesizes the area under the reference $v_{ref}$ waveform (FIG. 8B). In this manner, DC power from the battery 114 is converted into AC power by the first converter 116 for delivery through transformer 118 and the second converter 120 to provide uninterrupted power to the critical load 102. Thus, the output of the converter 120 is the power required by the critical load 102, rather than the harmonic distortion neutralizing current supplied during normal operation.

The HF-link SPS system 100 with the use of the HF-isolation transformer 118 advantageously allows the battery 114 to have a lower DC bus voltage level rating than that of the FIG. 1 embodiment. This lower DC bus voltage of battery 114 advantageously allows for higher battery reliability. Furthermore, it is safer for an operator to work with lower DC bus voltages. Also, a lower EMI (electromagnetic interference) is realized if one of the terminals of the electrically-isolated battery 114 may be grounded. Furthermore, an operating frequency of the HF-link SPS system 100 on the order of 20 kHz is above the audible frequency range. Additionally, the use of the optional 60 Hz isolation transformers 108 and 112 also minimizes audible noise problems. Similarly, the isolation transformers 82, 84 and 86 of the SPS system 10 in FIGS. 1 through 4 also minimize noise problems.

Third Embodiment

Three Phase Stand-By Power Supply System

Figure 10:
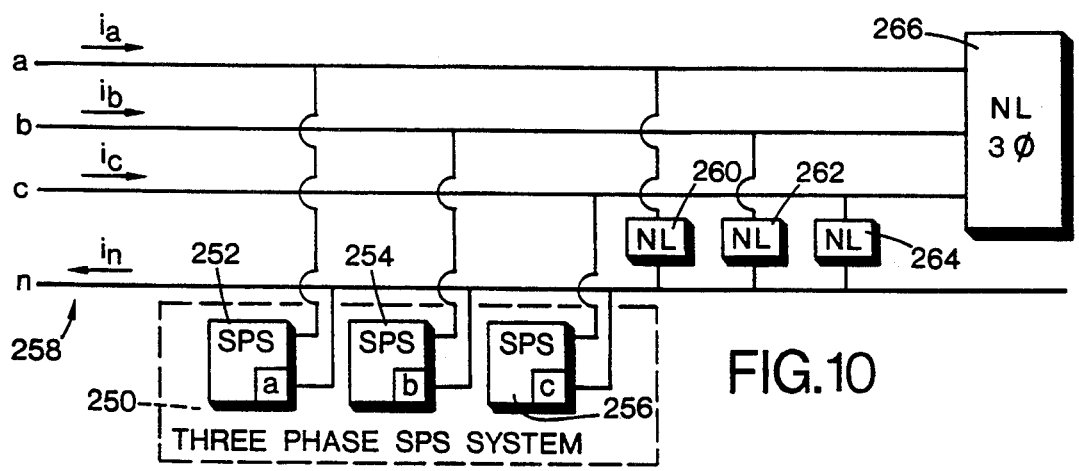
FIG. 10 is a schematic block diagram of one form of a three phase SPS system of the present invention coupled to a transmission line and several nonlinear loads.

Referring to FIG. 10, a three phase standby power supply (SPS) system 250 constructed in accordance with the present invention is illustrated. The three phase SPS system 250 has three line-to-neutral single phase SPS systems 252, 254 and 256, which may be constructed as described above for the SPS system 10 (FIGS. 1-4) or for the high frequency link SPS system 100 (FIGS. 5-9). The three phase SPS system 250 is coupled to a three phase, four wire utility transmission line 258 having three phase conductors labeled a, b and c, and a neutral conductor labeled n.

Under normal operating conditions, the three phase SPS system 250 neutralizes harmonic currents generated by a plurality of single phase loads 260, 262 and 264 coupled to the transmission line 258, as well as one or more three phase loads, such as load 266. In operation, the three phase SPS system 250 neutralizes the harmonic currents drawn by the loads 260, 262, 264 and 266. This harmonic neutralization results in sinusoidal line currents $i_a$, $i_b$ and $i_c$ being drawn from the three phase line 258 by the combination of the three phase SPS system 250 and the non-linear loads 260-266. That is, the SPS system 250 makes the non-linear loads 260-266 appear as linear loads when viewed from the transmission line 258. These sinusoidal line currents occur even if the line-to-neutral voltages of the transmission line 258 are distorted at the point where the SPS system 250 is coupled to the line 258.

Fourth Embodiment

Active Filter System for a Three Phase, Four Wire Service

Figure 11:
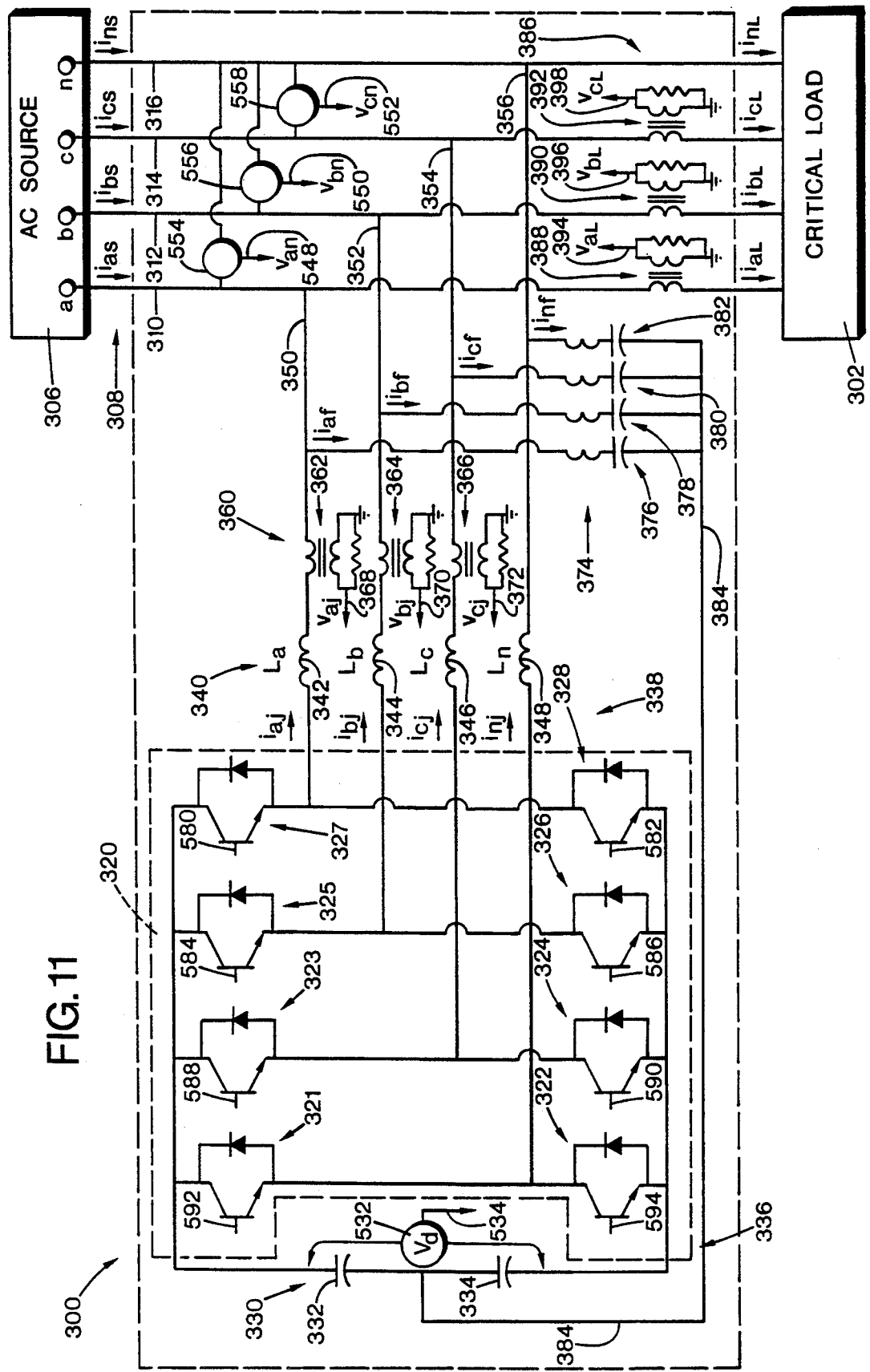
FIG. 11 is a schematic block diagram of one form of an active filter system of the present invention for use with a three phase four wire utility service powering a critical load.

FIG. 11 illustrates an active filter system 300 constructed in accordance with the present invention for neutralizing undesirable harmonic currents generated by a nonlinear critical load 302. The load 302 may actually comprise a plurality of three phase loads, such as load 266 in FIG. 10, and/or a group of single phase, line-to-neutral loads, such as loads 260, 262 and 264 in FIG. 10. The filter system 300 isolates the nonlinear harmonic currents drawn by the critical load 302 from traveling to an AC power source 306, such as a utility system through the utility's distribution or transmission lines 308. As mentioned in the background section above, nonlinear loads supplied by a three phase four wire utility service can produce harmonic currents on the neutral wire of a magnitude sufficient to overload and overhead the substation power transformer supplying the customers. Eventually, such overloading and overheating can lead to transformer failure, resulting in the power outage of a significant duration while the transformer is replaced.

The AC power service provided by source 306 comprises a three phase, four wire system, having phase a, b and c conductors 310, 312, 314, and a neutral conductor 316. The current drawn from the AC source 306 on lines 310–316 are labeled as $i_{as}$, $i_{bs}$, $i_{cs}$ and $i_{ns}$, respectively. The load currents drawn by the critical load 302 are labeled as phase currents $i_{aL}$, $i_{bL}$ and $i_{cL}$, with the neutral current indicated as $i_{nL}$.

The active filter 300 has a four switch-pole inverter 320 which has eight switch-diode combinations 321, 322, 323, 324, 325, 326, 327, and 328, which may be as described above for the switch-diode combinations 30a–30d of FIG. 1. The filter 300 has a DC voltage device comprising a capacitor bank 330, illustrated as a split capacitor bank having capacitor sections 332 and 334, coupled to a DC side 336 of the inverter 320.

The inverter 320 also has an AC side 338 which is coupled to the transmission line 308 through a series inductance 340. The illustrated series inductance 340 includes an $L_a$ inductance 342, a $L_b$ inductance 344, a $L_c$ inductance 346, and an optional $L_n$ inductance 348. The inverter AC side output currents $i_{aj}$, $i_{bj}$, $i_{cj}$ and $i_{nj}$ are carried from the series inductance 340 through the respective conductors 350, 352, 354 and 356 to couple with the transmission line conductors 310, 312, 314 and 316, respectively. An inverter output current sensor bank 360 has three current sensors 362, 364 and 366 coupled to lines 350, 352, and 354 to monitor the phase a, b and c inverter output currents. The current sensors 362, 364 and 366 produce respective $v_{aj}$, $v_{bj}$ and $v_{cj}$ sensor voltage signals 368, 370 and 372 in response to the respective inverter output currents $i_{aj}$, $i_{bj}$ and $i_{cj}$.

The filter 300 includes a high frequency filter bank 374, which has four high frequency filter units 376, 378, 380 and 382 coupled to the respective conductors 350, 352, 354 and 356. Each of the filter units 376–382 includes a series inductor and capacitor, with one side of each of the capacitors being coupled by a neutral return conductor 384 to the junction between the capacitor sections 332 and 334 of the split capacitor bank 330. The high frequency filter bank 374 prevents any high switching frequency currents $i_{af}$, $i_{bf}$, $i_{cf}$ and $i_{nf}$ generated by the inverter 320 from entering the AC source 306 or the critical load 302.

The filter 300 also has a load current sensor bank 386 which has three load current sensors 388, 390 and 392 coupled to conductors 310, 312 and 314, respectively. The current sensors 388, 390 and 392 measure the respective critical load currents $i_{aL}$, $i_{bL}$ and $i_{cL}$, and in response thereto produce $v_{aL}$, $V_{bL}$ and $v_{cL}$ voltage signals 394, 396 and 398, respectively.

Figure 12:
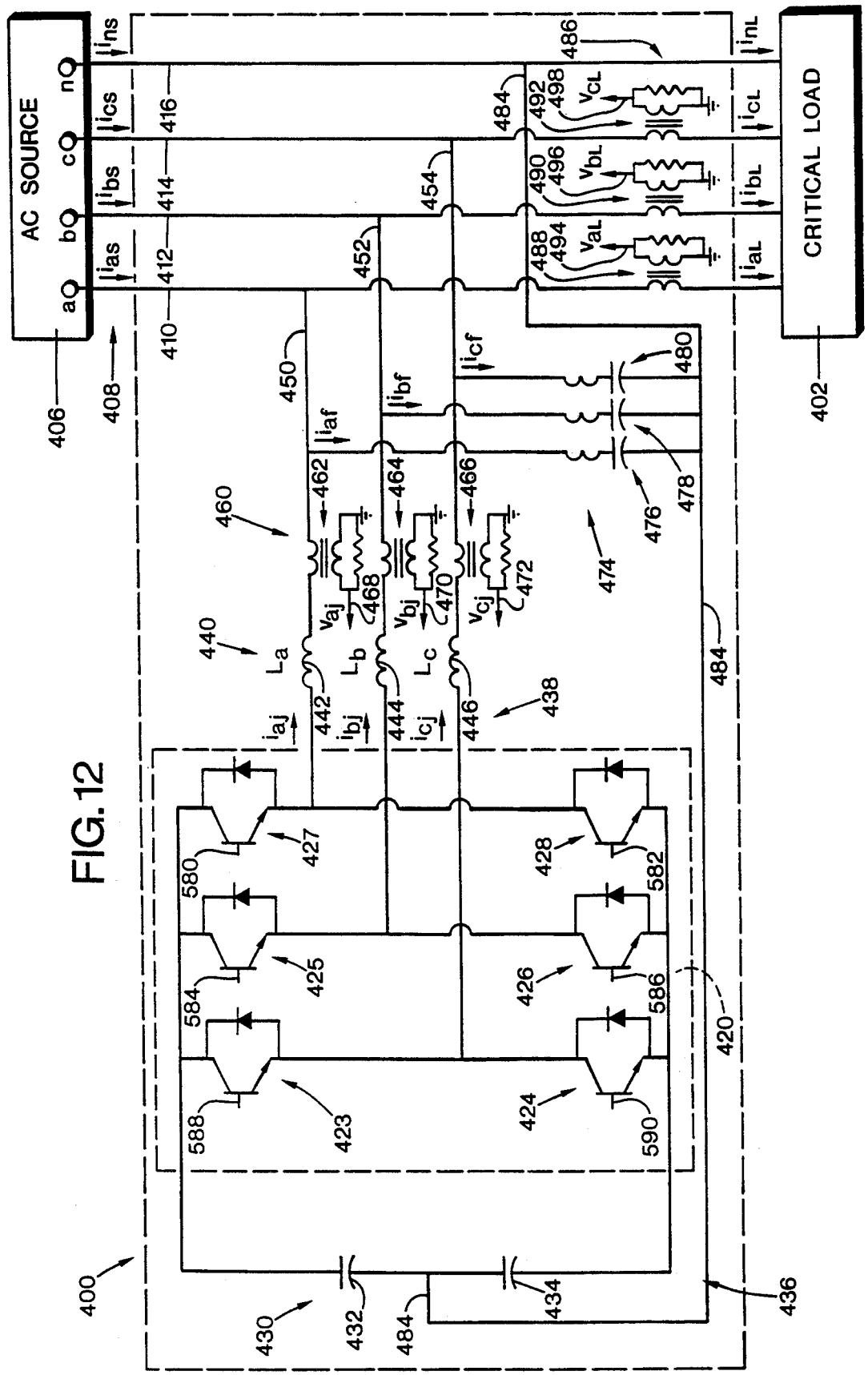
FIG. 12 is a schematic block diagram of an alternate form of an active filter system of the present invention for use with a three phase four wire utility service powering a critical load.

Referring to FIG. 12, an alternate active filter 400 is illustrated as having a three leg or three switch-pole inverter 420. The inverter 420 has six switch-diode combinations 421, 422, 423, 424, 425 and 426, which may be as described above for the switch-diode combinations 30a–30d of FIG. 1. The remaining items of the active filter 400 are as described above for the active filter 300, with their item numbers increased by a factor of 100. In filter 400, the fourth or neutral leg of the inverter 320 has been replaced by the neutral return conductor 484 coupling the junction of the split capacitors 432 and 434 with the high frequency filter bank 474 and the transmission line neutral conductor 416.

A. Operation

In operation, the active filter system 300 operates according to Kirchhoff's current law, so the sum of currents on all four wires at any location is equal to zero. With the subscripts a, b and c referring to the three phases, and the subscript n referring to the neutral, the following load, inverter and system neutral current equations are derived as:

$$i_{nL} = -(i_{aL} + i_{bL} + i_{cL}) \tag{1}$$

$$i_{nj} = -(i_{aj} + i_{cj}) \tag{2}$$

$$i_{ns} = -(i_{as} + i_{bs} + i_{cs}) \tag{3}$$

Thus, only three current sensors are needed in the inverter output current sensor bank 360 to determine the $i_{nj}$ neutral inverter current flowing through the neutral conductor 356. Similarly, only three current sensors are required in the load current sensor bank 386, since the $i_{nL}$ neutral load current is obtained using equation 2 above.

Each of the phase load currents consists of its fundamental frequency component $i_{kL,1}$ and a distortion current component $i_{kL,dis}$, to yield the equation:

$$i_{kL} = i_{kL,1} + i_{kL,dis} \tag{4}$$

where the subscript letter k is used herein to represent the phases a, b and c. The load current sensors 388–390 provide the $V_{aL}$, $V_{bL}$, $V_{cL}$ voltage signals 394, 396, 398 which are proportional to the respective phase load currents $i_{aL}$, $i_{bL}$, $i_{cL}$, respectively. Therefore, equation 4 can be written in terms of the voltage signals 394–398 as follows:

$$V_{kL} = V_{kL,1} + V_{kL,dis} \tag{5}$$

Figure 13:
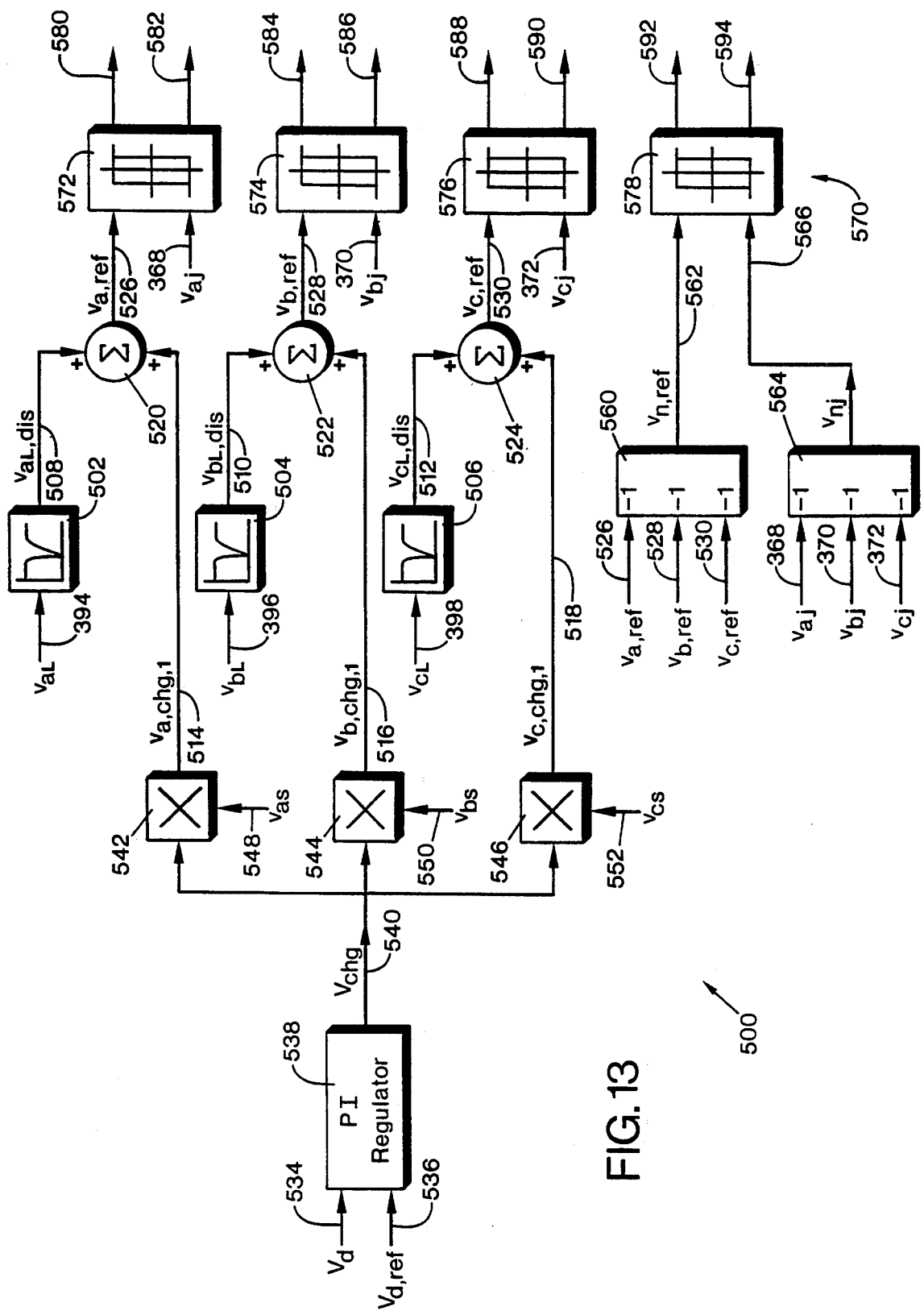
FIG. 13 is a block diagram of one form of a controller for controlling the system of FIG. 11.

Referring briefly to FIG. 13, a controller 500 constructed in accordance with the present invention as a component of the active filter system 300 is illustrated. The controller 500 includes three notch filters 502, 504, and 506 which receive the respective load sensor signals 394, 396 and 398. These notch filters may operate as described above for the line frequency notch filter 62 of FIG. 2. The notch filters 502–506 filter out the fundamental frequency components $V_{kL,1}$ from the sensor signals 394–398 to obtain the distortion current component signal $V_{kL,dis}$. The operation of the controller 500 is discussed in further detail below.

The harmonic neutralizing currents $i_{aj}$, $i_{bj}$, $i_{cj}$ are measured by sensor bank 360 to provide the respective output voltage signals 368, 370 and 372, designated as $V_{kj}$. The active filter system 300 provides the distortion components of the load currents from the inverter 320, so the distortion current components do not have to be supplied by the AC source 306. In effect, the filter 300 neutralizes the distortion current components of the load 302, so the combination of the filter and load appear to the AC source 306 as a linear load.

On the DC side 336 of the inverter 320, the DC voltage across the capacitor bank 330 is supported by small charging currents $i_{k,chg,1}$ at the fundamental frequency which are supplied from the AC source 306 to invertor 320. These small charging currents $i_{k,chg,1}$ compensate for losses in the active filter system 300. Therefore, under steady state operating condition, the inverter output currents may be represented as:

$$i_{kj} = i_{kL,dis} + i_{kf} - i_{k,chg,1} \tag{6}$$

where $i_{kf}$ is the high switching frequency ripple component removed by the high frequency filter bank 374 from the inverter output current $i_{kj}$. If the performance of the filter bank 374 in removing the high switching frequency ripple component $i_{kf}$ is assumed to be ideal, then the AC source input current may be determined as follows:

$$i_{ks} = i_{kL,1} + i_{k,chg,1} \tag{7}$$

It is apparent that each phase of the source current $i_{ks}$ will be entirely at the fundamental frequency, so no distortion current components are injected into the AC source 306 from the load 302. Moreover, not only the phase currents, but also the $i_{ns}$ neutral source current will also be entirely at the fundamental frequency.

B. The Controller

Referring now to FIG. 13, the notch filters 502–506 are sharply tuned with a notch frequency equal to the fundamental frequency of the AC source 306. Ideally, the notch filters 502–506 provide $v_{aL,dis}$, $v_{bL,dis}$, $v_{cL,dis}$ signals 508, 510 and 512, respectively which are proportional to the distortion current components for each phase. To account for the capacitor bank charging voltage, $v_{a,chg,1}$, $v_{b,chg,1}$, $v_{c,chg,1}$ signals 514, 516, 518 are added to the distortion component signals 508, 510, 512 by summer devices 520, 522, 524, respectively. These summer devices 520, 522, 524 generate $v_{a,ref}$, $v_{b,ref}$, $v_{c,ref}$ reference signals 526, 528 and 530.

To obtain the proper amplitude of the capacitor charging bank, the voltage signals 514–518 maybe determined in the following manner. Referring to FIG. 11, the filter 300 may include a capacitor bank voltage meter 532 which measures the DC voltage across the capacitor bank 330, and in response thereto, generates a $V_d$ capacitor bank voltage signal 534. Referring again to FIG. 13, the measured DC capacitor voltage signal 534 is compared with a preselected reference value $V_{d,ref}$ signal 536 by a proportional-integral ("PI") regulator device 538. The PI regulator 538 determines the error between the measured signal 534 and the reference signal 536, and amplifies the error to provide a $V_{chg}$ amplitude adjustment signal 540. The amplitude adjustment signal 540 is supplied to three multiplier devices 542, 544 and 546.

Referring again to FIG. 11, the multiplier devices 542–546 receive $v_{as}$, $v_{bs}$ and $v_{cs}$, signals 548, 550 and 552 from three respective voltage sensors 554, 556 and 558. The sensors 554, 556, 558 measure the incoming line-to-neutral voltages between the respective phase conductors 310, 312, 314, and the neutral conductor 316. For clarity, the capacitor bank voltage sensor 532 and the incoming line current sensors 554, 556 and 558 are not shown for the active filter 400 of FIG. 12.

Referring again to FIG. 13, the multiplier device 542 multiplies together signals 540 and 548 to provide an output of signal 514. Similarly, multiplier 544 multiplies together signals 540 and 550 to supply and output of signal 516. And finally, multiplier device 546 multiplies together signals 540 and 552 to provide an output of signal 518. Thus, the fundamental component voltage charging signals 514–518 are each factored to obtain a proper amplitude for the voltage required to support the capacitor bank 330.

when compared with the active filters 300 and 400 illustrated in FIGS. 11 and 12.

TABLE 1

Active Filter Performance Characteristics Comparison

| Filter Strategies | DC-Side Voltage | DC-Side Current, $i_d$ | No. of Switches |
|---|---|---|---|
| Three Full-Bridges (Prior Art) | $\geq \sqrt{2} * V_s(\text{rms})$ | • Low order harmonics<br>• $I_d(\text{rms}) = 1.54A$, with unipolar voltage switching.<br>• $I_d(\text{rms}) = 2.2 A$, with bipolar voltage switching | 12 |
| 4-legs with Capacitor Midpoint (Filter 400) | $\geq \dfrac{(\sqrt{3} * \sqrt{2})}{0.87} * V_s(\text{rms})$ | • Low order harmonics<br>• $I_d(\text{rms}) = 4.0 A$ | 6 |
| 4 switch poles (Filter 300) | $\geq \sqrt{3} * \sqrt{2} * V_s(\text{rms})$ | • High order harmonics only<br>• $I_d(\text{rms}) = 2.0 A$ | 8 |

Comparison of Various Active Filter Strategies. $V_S$ is the system phase-to-neutral voltage. The current rms values result from a per-phase third harmonic current of 2.2 A(rms), equal in amplitude and phase A neutral voltage reference summer device 560 receives the $v_{a,ref}$, $v_{b,ref}$, $V_{c,ref}$ signals 526, 528, 530 from the respective summer devices 520, 522, and 524. The summer device 560 adds together the negative values (indicated by the "−1" symbols in FIG. 13) to generate a $v_{n,ref}$ neutral voltage reference signal 562. A second summer device 564 receives the voltage signals 368, 370, and 372 from the inverter current sensors 562, 564 and 566. The second summer 564 adds together the negative values of the voltage signals 368, 370, and 372 to generate a $v_{nj}$ inverter neutral voltage signal 566.

The controller 500 includes a current mode controller portion 570 which includes phase a, b, c and neutral current mode controller devices 572, 574, 576 and 578. In the illustrated embodiment, the current mode controllers 572–578 are constant tolerance band controllers, which may be as described above for the controller 70 of FIG. 3, including a signal isolation and amplification section 78 (not shown). Alternatively, an adaptive tolerance band controller may be used, or any other analog or digital control devices which are known to be structurally equivalent by those skilled in the art.

The current mode controller 572 receives and compares signals 526 and 368 to provide gate signals 580 and 582 to the switches of combinations 327 and 328, respectively, to generate the inverter output current $i_{aj}$. The current mode controller 574 receives and compares signals 528 and 370 to provide gate signals 584 and 586 to the switches of combinations 325 and 326, respectively, to generate the inverter output current $i_{bj}$. The current mode controller 576 receives and compares signals 530 and 372 to provide gate signals 588 and 590 to the switches of combinations 323 and 324, respectively, to generate the inverter output current $i_{cj}$. The current mode controller 578 receives and compares signals 562 and 566 to provide gate signals 592 and 594 to the switches of combinations 321 and 322, respectively to generate the inverter output current $i_{nj}$.

It is apparent that the controller 500 may be modified for use with the alternative active filter 400 of FIG. 12 by deleting summers 560, 564 and the current mode controller 578.

C. Advantages

Table 1 compares the performance of the prior art systems using three full single phase inverter bridges The active filters 300 and 400 obviously require less switches than the three single phase full bridge converters required in the earlier devices. For the true four-leg topology of filter 300, there is a slight increase in the number of switches over the split capacitor topology of filter 400, however this slight increase in the number of switches is outweighed by several factors.

First, for a given load configuration, a lower DC bus voltage $V_d$ is required for filter system 300. Secondly, the current through the capacitor bank 330 has a lower rms (root mean squared) value than the current through capacitor bank 430. In a balanced system, or when the utility system is nearly in balance, the high switching frequency harmonics dominate and are removed by the filter bank 374. That is, assuming the appropriate values are chosen for the capacitors of filter bank 374 (i.e., capacitors whose impedance does not become "inductive" at higher frequencies), the high switching frequency harmonic currents do not contribute to any significant ripple on the DC bus voltage.

While the earlier three single phase full bridge converter approach has an attractive low DC bus voltage, three such buses are required. Moreover, the earlier system requires the DC bus voltages to handle low order harmonic currents with rms current levels approximately the same as that of the four switch pole approach of filter 300. Thus, while the tradeoffs between the systems chosen will vary by implementation, the active filters 300 and 400 illustrated herein provide a variety of advantages over the earlier systems.

Specifically, the filters 300 and 400 provide active filtration of load current harmonics with a performance comparable to earlier known devices, and in addition filters 300 and 400 are less costly to manufacture and operate and physically are more compact. Additionally, using the active filter system of the present invention, load current harmonics are neutralized from entering the AC source and overloading and overheating neutral conductors, distribution transformers and substation transformers.

Conclusion

Having illustrated and described the principles of our invention with respect to a preferred embodiment, it should be apparent to those skilled in the art that our invention may be modified in arrangement and detail without departing from such principles. For example, other inverters and converters may be used, as well as other methods of generating gate signals to control the chosen inverter or converter in the manner described herein. The controllers described herein may be constructed using other analog or digital hardware or software, or combinations thereof, which are known to be structurally equivalent to those skilled in the art. Furthermore, other types of sensors may be used to provide the controller inputs. With respect to the embodiment of FIGS. 5-9, alternately, the first and second converters 116, 120 may communicate directly or operate in unison. Furthermore, the first converter 116 may be controlled to facilitate the operation of the second converter 120 in either the normal or emergency mode of operation. We claim all such modifications falling within the scope and spirit of the following claims.

We claim:

1. A method of operating a power converter positioned in shunt with a three-phase four wire AC system including three-phase conductors and a neutral conductor, the power converter including a DC power storage system, the method comprising the steps of:

sensing distorted line-to-neutral voltage signals on said four wire AC system to generate voltage distortion signals;

identifying a DC power level signal corresponding to said DC power storage system;

processing said voltage distortion signals and said DC power level signal to obtain gate signals that force said power converter to produce harmonic neutralized three-phase sinusoidal currents on said three-phase four wire system.

2. The method of claim 1 further including the step of processing said source voltage sensor signals to yield first, second, and third voltage distortion component signals.

3. The method of claim 2 further including the step of deriving first, second, and third charging voltage signals from said DC power level signal.

4. The method of claim 3 further including the step of adding said first, second, and third voltage distortion component signals with said first, second, and third capacitor charging voltage signals, to produce first, second, and third voltage controller reference signals.

5. The method of claim 4 further including the steps of sensing first, second, and third inverter signals; and combining said first, second, and third voltage controller reference signals and said first, second, and third inverter signals, to produce a plurality of gate signals for said power controller.

6. The method of claim 3 further including the step of combining said first, second, and third voltage controller reference signals to produce a neutral controller voltage reference signal.

7. The method of claim 6 further including the steps of:

sensing first, second, and third current signals; and combining said first, second, and third inverter signals to yield an aggregate inverter signal.

8. The method of claim 7 further including the step of combining said neutral controller voltage reference signal and said aggregate inverter signal to produce gate signals for said power controller.

9. An apparatus for neutralizing load current harmonics in an electrical load, comprising:

a power converter having an AC side and a DC side, with the AC side for coupling in parallel with a three-phase AC power source providing power to the load;

a capacitor bank coupled to the DC side of the converter, the converter supporting a DC charging voltage across the capacitor bank with power drawn from the AC source;

a harmonic current sensor for sensing a harmonic distortion current component of a load current drawn by the load, the harmonic current sensor including:

a converter current sensor for generating a converter current sensor signal in response to an output current of the AC side of the converter;

a load current sensor for generating load current sensor signals in response to the load current;

voltage sensors for generating source voltage sensor signals in response to line-to-neutral voltages of the three-phase AC source; and a capacitor bank voltage detector for generating a capacitor bank voltage signal in response to a DC voltage across the capacitor bank; and a controller responsive to the harmonic current sensor for causing the power converter to generate a harmonic neutralizing current, the neutralizing added to the load current to cancel the harmonic distortion current component, wherein the controller includes:

a regulator for comparing the capacitor bank voltage signal with a preselected reference value signal to generate an amplitude adjustment signal;

a multiplier for multiplying the source voltage sensor signals by the amplitude adjustment signal to generate a capacitor bank charging voltage signal;

a notch filter for removing a fundamental frequency component signal representative of a fundamental frequency component of the load current from the load current sensor signal to generate a distortion current component signal representative of the harmonic distortion current component;

a first summer for summing together the distortion current component signal and the capacitor bank voltage signal to generate an inverter current reference signal;

a second summer for summing together the negative value of the inverter current reference signal to generate a neutral voltage reference signal;

a third summer for summing together the negative value of the inverter current reference signal with the inverter current sensor signal, and for comparing the neutral voltage reference signal with the inverter neutral voltage signal, to generate the control signal.

10. An apparatus for neutralizing load current harmonics in an electrical load, comprising:

a power converter having an AC side and a DC side, with the AC side for coupling in parallel with an AC power source providing power to the load, the AC power source comprising a three-phase four wire service including three phase conductors and a neutral conductor, the power converter including plural switching devices arranged to generate an AC side output current comprising three inverter phase currents to supply the respective phase conductors;

a harmonic current sensor for sensing a harmonic distortion current component of a load current drawn by the load;

a switching frequency filter for filtering any switching frequency current components from the AC side output current, with the filter having a neutral junction;

a DC capacitor bank coupled to the DC side of the converter, with the capacitor bank having two capacitor sections with a junction therebetween;

a neutral return conductor coupling together the capacitor bank junction, the filter neutral junction, and the neutral conductor; and a controller responsive to the harmonic current sensor for causing the power converter to generate a harmonic neutralizing current, the neutralizing current added to the load current to cancel the harmonic distortion current component.

11. An apparatus according to claim 10 wherein:

the converter supports a DC charging voltage across the capacitor bank with power drawn from the AC source;

the harmonic current sensor comprises:

a converter current sensor for generating a converter current sensor signal in response to all output current of the AC side of the converter;

a load current sensor for generating load current sensor signals in response to the load current;

a voltage sensor for generating a source voltage sensor signal in response to a line-to-neutral voltage of the AC source; and a capacitor bank voltage detector for generating a capacitor bank voltage signal in response a DC voltage across the capacitor bank;

the controller comprises:

a regulator for comparing the capacitor bank voltage signal with a preselected reference value signal to generate an amplitude adjustment signal;

a multiplier for multiplying the source voltage sensor signal by the amplitude adjustment signal to generate a capacitor bank charging voltage signal;

a notch filter for removing a fundamental frequency component signal representative of a fundamental frequency component of the load current from the load current sensor signal to generate a distortion current component signal representative of the harmonic distortion current component;

a first summer for summing together the distortion current component signal and the capacitor bank charging voltage signal to generate an inverter current reference signal; and a comparator for comparing the inverter current reference signal with the inverter current sensor signal, and for comparing the neutral voltage reference signal with the inverter neutral voltage signal, to generate the control signal.

12. An apparatus for neutralizing load current harmonics in an electrical load comprising:

a power converter having an AC side and a DC side with the AC side for coupling in parallel with a three-phase four wire AC power source providing power to the load;

a capacitor bank coupled to the DC side of the converter; wherein the converter supports a DC charging voltage across the capacitor bank with power drawn from the AC source;

a harmonic current sensor for sensing a harmonic distortion current component of a load current drawn by the load, the harmonic sensor including:

a converter current sensor for generating a converter current sensor signal in response to an output current of the AC side of the converter;

a load current sensor for generating load current sensor signals in response to the load current;

a voltage sensor for generating source voltage sensor signals in response to individual line-to-neutral voltages of at least two phases of the AC source; and a capacitor bank voltage detector for generating a capacitor bank voltage signal in response to a DC voltage across the capacitor bank; and a controller responsive to the harmonic current sensor for causing the power converter to generate a harmonic neutralizing current, the neutralizing current added to the load current to cancel the harmonic distortion current component.

13. An apparatus for neutralizing load current harmonics in an electrical load, comprising:

a power converter having an AC side and a DC side, with the AC side for coupling in parallel with three phase conductors of an AC power source providing power to the electrical load, wherein the power converter comprises an inverter having at least six switching devices responsive to a control signal for producing an inverter output current, the inverter including a DC charging voltage across a capacitor bank with power drawn from the AC source;

a harmonic current sensor for sensing a harmonic distortion current component of a load current drawn by the electrical load, the harmonic current sensor including:

three voltage sensors for generating source voltage sensor signals in response to the line-to-neutral voltage of the three phase conductors of the AC source;

a capacitor bank voltage detector for generating a capacitor bank voltage signal in response to a DC voltage across the capacitor bank;

three inverter current sensors for generating inverter current sensor signals in response to the inverter output current; and three load current sensors for generating load current sensor signals in response to the load current; and a controller responsive to the harmonic current sensor for causing the power converter to generate a harmonic neutralizing current, the neutralizing current added to the load current to cancel the harmonic distortion current component.

14. An apparatus according to claim 13 wherein:

the inverter has at least eight switching devices arranged to generate an inverter output current comprising three inverter phase currents to supply the respective phase conductors and a neutral current to supply the neutral conductor; and the apparatus further includes a switching frequency filter for filtering any switching frequency current components from the inverter output current.

15. An apparatus for delivering sinusoidal currents to an electrical load, comprising:

a power converter having an AC side and a DC side, with the AC side coupled in parallel with an AC power source providing power to the electrical load with a three-phase four wire system including three-phase conductors and a neutral conductor, and the DC side coupled to a DC storage system;

a plurality of voltage sensors for generating source voltage sensor signals corresponding to distorted line-to-neutral voltage signals of the three-phase conductors of the AC source;

a DC storage system voltage detector for generating a DC voltage signal in response to a DC voltage across the DC storage system; and a controller responsive to said source voltage sensor signals and said DC voltage signal to cause the power converter to generate harmonic neutralized three-phase sinusoidal currents on said three-phase four wire system.

16. The apparatus of claim 15 further including means for processing said source voltage sensor signals to yield first, second, and third voltage distortion component signals.

17. The apparatus of claim 16 further including means for deriving first, second, and third DC charging voltage signals.

18. The apparatus of claim 17 further including means for adding said first, second, and third voltage distortion component signals with said first, second, and third DC charging voltage signals, to produce first, second, and third voltage controller reference signals.

19. The apparatus of claim 18 further including
first, second, and third inverter current sensors that provide first, second, and third inverter signals; and
first, second, and third current mode controller devices that respectively receive said first, second, and third voltage controller reference signals and said first, second, and third inverter signals, to produce a plurality of gate signals for said power controller.

20. The apparatus of claim 18 further including means for combining said first, second, and third voltage controller reference signals to produce a neutral controller voltage reference signal.

21. The apparatus of claim 20 further including
first, second, and third inverter current sensors that provide first, second, and third inverter signals; and
means for combining said first, second, and third inverter signals to yield an aggregate inverter signal.

22. The apparatus of claim 21 further including a fourth current mode controller that receives said neutral controller voltage reference signal and said aggregate inverter signal and produces gate signals for said power controller.

* * * * *